United States Patent [19]

Kadis

[11] Patent Number: 5,065,606
[45] Date of Patent: Nov. 19, 1991

[54] PRESS ASSEMBLY WITH CUSHION ASSEMBLY AND AUXILIARY APPARATUS

[75] Inventor: Paul M. Kadis, Chardon, Ohio

[73] Assignee: Teledyne Industries, Inc., Cleveland, Ohio

[21] Appl. No.: 596,525

[22] Filed: Oct. 12, 1990

Related U.S. Application Data

[63] Continuation-in-part of Ser. No. 429,200, Oct. 30, 1989, Pat. No. 5,003,807.

[51] Int. Cl.⁵ .............................................. B21D 24/16
[52] U.S. Cl. ......................................... 72/348; 72/351
[58] Field of Search ................. 72/297, 348, 350, 351, 72/417, 453.13; 267/119

[56] References Cited

U.S. PATENT DOCUMENTS

| | | |
|---|---|---|
| 1,638,881 | 8/1927 | Rode . |
| 2,689,539 | 9/1954 | Lyon ..................................... 72/348 |
| 3,456,478 | 7/1969 | Alexander . |
| 3,914,978 | 10/1975 | Sekanina et al. ..................... 267/119 |
| 4,499,750 | 2/1985 | Gerber et al. . |
| 4,635,466 | 1/1987 | Seki et al. . |
| 4,821,552 | 4/1989 | Baur et al. . |

Primary Examiner—Lowell A. Larson
Attorney, Agent, or Firm—Tarolli, Sundheim & Covell

[57] ABSTRACT

A press assembly is operable between open and closed conditions to deform a workpiece. During operation of the press assembly, the workpiece is held by upper and lower draw rings which apply pressure to opposite sides of the workpiece. A cushion assembly is operable to provide a yieldable force opposing movement of the draw rings. An auxiliary apparatus is operable to perform an operation on the workpiece while the workpiece is in the press assembly. A control valve is operable to a closed condition to block fluid flow from the cushion assembly to maintain the cushion assembly in a retracted condition during at least an initial portion of the operation of the press assembly from the closed condition to the open condition. During operation of the press assembly from the open condition toward the closed condition, the piston in a control cylinder is movable under the influence of force transmitted from the upper draw ring to pump fluid to both the cushion assembly and the auxiliary apparatus.

108 Claims, 5 Drawing Sheets

PRESS ASSEMBLY WITH CUSHION ASSEMBLY AND AUXILIARY APPARATUS

RELATED APPLICATION

This application is a continuation-in-part of application Ser. No. 429,200, filed Oct. 30, 1989 by John Terrell, Paul Kadis, Leonard Hiney and Susan Pfaff and entitled "Press Assembly and Method of Operation", now U.S. Pat. No. 5,003,807 granted Apr. 2, 1991. The benefit of the earlier filing date of the aforesaid application Ser. No. 429,200 has been and hereby is claimed for all common subject matter.

BACKGROUND OF THE INVENTION

The present invention relates to a press assembly and method of operating the press assembly. Specifically, the invention relates to operation of a cushion assembly and/or an auxiliary apparatus in a press assembly.

There are many known press assemblies which are used to deform workpieces. These known press assemblies may have an upper die which cooperates with a lower die to deform the workpiece. Workpiece holders may be associated with the upper and/or lower dies. Press assemblies having known constructions are disclosed in U.S. Pat. Nos. 1,884,700; 2,217,172; 3,296,850; 3,456,478; 3,636,748; and 3,636,749.

Stretch drawing is performed during the operation of some known press assemblies. During stretch drawing, the edges of a sheet metal workpiece are firmly gripped between upper and lower draw rings. After the workpiece has been gripped, an upper die is closed against a lower die to deform the workpiece. Under certain circumstances, a stretch draw operation is preferred because it reduces the total amount of metal used to form an article, tends to improve the quality of the article, and facilitates maintaining uniform quality during production of a series of articles.

In an effort to avoid noise, vibration and shock loading of components of a press assembly during operation of the press assembly from an open condition to a closed condition, U.S. Pat. Nos. 4,499,750 and 4,635,466 suggest that a lower draw ring or sheet metal holder be accelerated in a downward direction before an upper draw ring comes into contact with the workpiece. In the case of U.S. Pat. No. 4,499,750, downward acceleration of the lower draw ring is effected by actuation of a control valve in timed relationship with opening of the press. Actuation of the control valve exposes a piston to fluid pressure to move the lower draw ring downwardly against the influence of a die cushion piston.

In the case of U.S. Pat. No. 4,635,466, a pilot pin is engaged by an upper die and moved downwardly to compress hydraulic fluid in a chamber connected with a lower bolster. The fluid is exhausted from the chamber through a choker restriction so that as the pilot pin move downwardly, the fluid pressure in the chamber causes the lower bolster to be moved downwardly.

During operation of a press assembly from a closed condition to an open condition, upward movement of a lower die has been retarded to prevent the lower die from moving upwardly simultaneously with upward movement of the upper die and a striking of the bottom of a formed workpiece on the upper die before the workpiece has been released. In U.S. Pat. No. 3,456,478, fluid flow from a locking cylinder chamber is blocked to delay upward movement of a lower die until a predetermined point in an opening cycle of the press assembly. By delaying upward movement of the lower die, striking of the formed workpiece before the blank holder is released is prevented.

During operation of a press having a draw ring, it has been suggested that return movement of the draw ring be retarded with respect to the return of an upper die of the press. In order to retard upward movement of the draw ring, it is suggested in U.S. Pat. No. 1,638,881 that fluid pressure be applied against a relatively small surface area on the upper side of a piston connected with the draw ring. The fluid pressure on the lower side of the piston is able to move the draw ring upwardly with a reduced force which is just sufficient to move the workpiece or shaped article from a lower die. The operation of a valve for controlling the application of fluid pressure to the upper side of the piston is controlled as a function of movement of the upper die of the press assembly.

SUMMARY OF THE INVENTION

The present invention relates to a press assembly and method of operation of a press assembly which may have upper and lower draw rings or members to apply pressure to opposite sides of a workpiece during operation of the press assembly. When the press assembly is operated from an open condition to a closed condition, the upper draw ring is moved downwardly toward the lower draw ring. Before the upper draw ring impacts against the lower draw ring, the lower draw ring may be accelerated in a downward direction by transmitting force from the upper draw ring or other member to a cushion assembly. Force transmitted from the upper draw ring to the cushion assembly effects operation of the cushion assembly toward a retracted condition so that the lower draw ring is moving downwardly when the upper draw ring impacts with the lower draw ring. Since the lower draw ring is moving downwardly when it is impacted with the upper draw ring, shock loading is reduced.

In accordance with a feature of the invention, the cushion assembly is maintained in a retracted condition during at least an initial portion of the operation of the press assembly toward the open condition. To maintain the cushion assembly in the retracted condition, a control valve blocks fluid flow from the cushion assembly during at least the initial portion of operation of the press assembly from the closed condition to the open condition. When the press assembly reaches a predetermined point in its operating cycle, the control valve is actuated to enable fluid to be exhausted from the cushion assembly.

In accordance with another feature of the present invention, an auxiliary apparatus is provided to perform an operation on the workpiece while the workpiece is in the press assembly. The auxiliary apparatus is operable under the influence of energy transmitted by fluid pumped from a control cylinder assembly during operation of the press assembly from the open condition to the closed condition. The control cylinder assembly may be actuated under the influence of force transmitted from the upper draw ring or other member in the press assembly.

Accordingly, it is an object of this invention to provide a new and improved press assembly and method in which a cushion assembly is operated from an extended condition to a retracted condition to provide a yieldable force during operation of the press assembly from an open condition to a closed condition and wherein the cushion assembly is maintained in the retracted condition during at least an initial portion of the operation of the press assembly from the closed condition toward the open condition.

Another object of this invention is to provide a new and improved press assembly and method in which an auxiliary apparatus performs an operation on a workpiece while the workpiece is in the press assembly, the auxiliary apparatus being operated under the influence of energy transmitted by fluid pumped from a control cylinder assembly during operation of the press assembly from the open condition to the closed condition.

BRIEF DESCRIPTION OF THE DRAWINGS

The foregoing and other objects and features of the present invention will become more apparent upon a consideration of the following description taken in connection with the accompanying drawings, wherein.

DESCRIPTION OF SPECIFIC PREFERRED EMBODIMENTS OF THE INVENTION

Press Assembly—General Description

Figure 1:
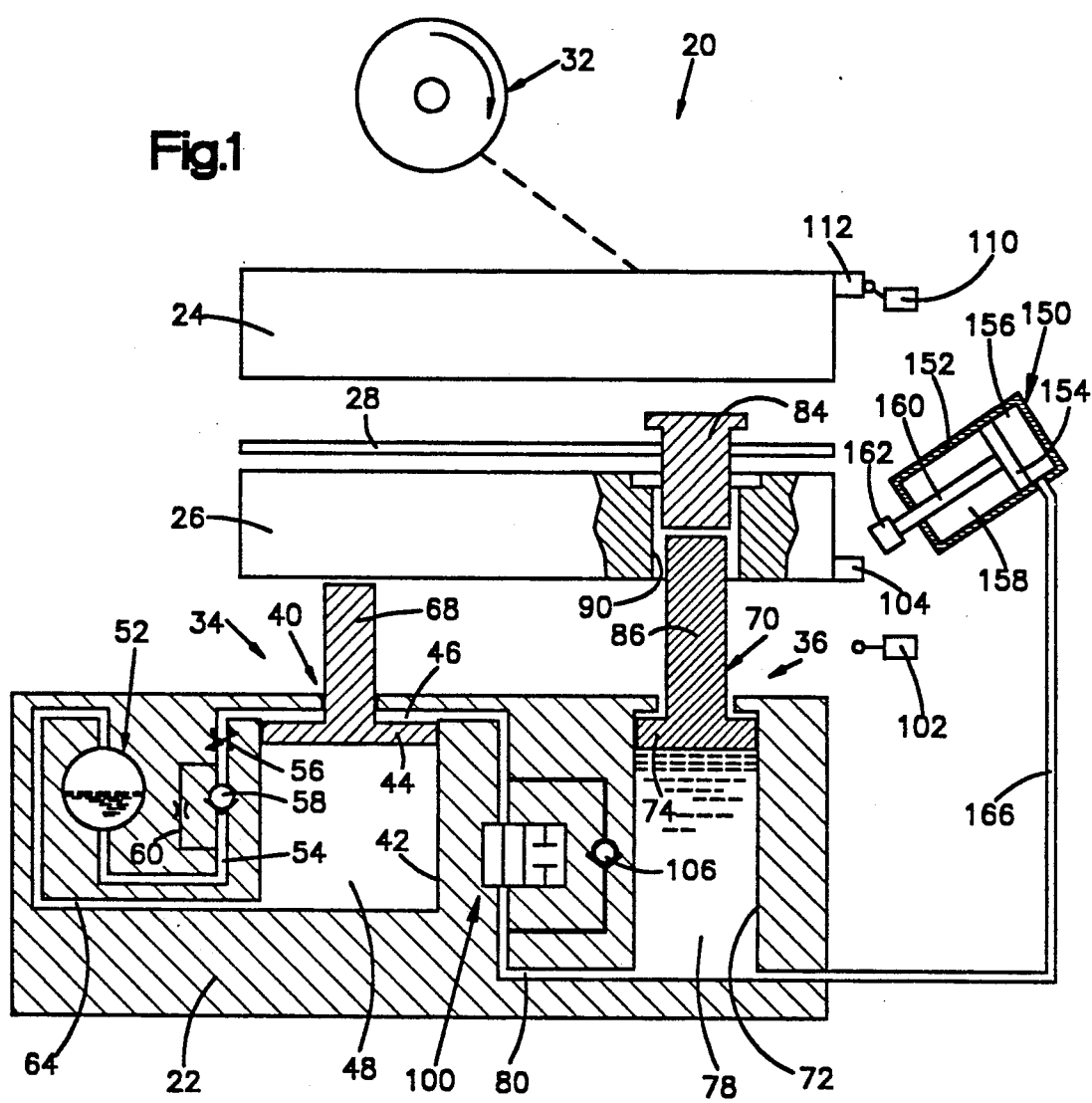
FIG. 1 is a schematic illustration of a press assembly having a cushion assembly which is maintained in a retracted condition during at least a portion of the operation of the press assembly from a closed condition to an open condition and having an auxiliary apparatus which performs operations on a workpiece while the workpiece is in the press assembly.

An improved press assembly 20 is illustrated schematically in FIG. 1. The press assembly 20 includes a stationary base 22. An upper draw ring or member 24 cooperates with a movable lower draw ring or member 26 during operation of the press assembly to deform a sheet metal workpiece 28. During operation of the press assembly 20, the upper and lower draw rings 24 and 26 are operable to apply pressure to opposite sides of the sheet metal workpiece 28 to firmly grip the workpiece between the draw rings. Once the workpiece 28 has been gripped between the upper and lower draw rings 24 and 26, the draw rings are lowered to deform the workpiece around a die (not shown) in a stretch forming operation.

The upper and lower draw rings or members 24 and 26 have a generally rectangular configuration with an open central portion. The openings in the central portions of the upper and lower draw rings 24 and 26 have configurations corresponding to the configurations of the die around which the workpiece 28 is to be drawn. It should be understood that the upper and lower draw rings 24 and 26 have only been shown very schematically in the drawings and may have any desired configuration.

When the press assembly 20 is operated to stretch draw the sheet metal workpiece 28, a drive assembly 32 moves the upper draw ring 24 downwardly toward the workpiece 28. As the downward motion of the upper draw ring 24 continues, the upper draw ring and workpiece 28 impact against the lower draw ring 26 to firmly grip the edges of the sheet metal workpiece. The upper and lower draw rings 24 and 26 are then lowered together to stretch the workpiece 28 over the lower die and thereby deform the workpiece.

A cushion assembly 34 is mounted on the base 22. The cushion assembly 34 applies a yieldable force to the lower draw ring 26. This yieldable force opposes downward movement of the lower draw ring 26 during operation of the press assembly to a closed condition. Thus, the cushion assembly 34 cushions movement of components of the press assembly 20 during the closing of the press assembly. Although only a single cushion assembly 34 has been shown schematically in the drawings, it should be understood that the press assembly 20 includes a plurality of cushion assemblies 34.

A control cylinder assembly 36 is operable to effect acceleration of the lower draw ring 26 before the upper draw ring 24 closes on the lower draw ring. By accelerating the lower draw ring 26 during closing of the press assembly 20, shock loading is reduced when the upper draw ring 24 and workpiece 28 are impacted against the lower draw ring 26. Although only a single control cylinder assembly 36 has been shown schematically in the drawings, it should be understood that the press assembly 20 includes a plurality of control cylinder assemblies 36. Although the cushion assembly 34 and control cylinder assembly 36 have been described herein in association with the upper and lower draw rings 24 and 26, the cushion assembly and control cylinder assembly could be associated with other members in a different type of press assembly.

The press assembly 20 has the same general construction as described in U.S. patent application Ser. No. 429,200, filed Oct. 30, 1989 by John Terrell, Paul Kadis, Leonard Hiney, and Susan Pfaff and entitled "Press Assembly and Method of Operation" (now U.S. Pat. No. 5,003,807). However, the press assembly 20 could have a different construction if desired.

Cushion Assembly

The cushion assembly 34 includes a piston and cylinder assembly 40. The piston and cylinder assembly 40 includes a cylinder 42 which is connected with the base 22. A piston 44 divides the cylinder 42 into upper and lower variable volume chambers 46 and 48. The upper variable volume chamber 46 contains hydraulic fluid and is connected in fluid communication with an accumulator 52 through a conduit 54.

An adjustable flow control orifice 56 is provided in the conduit 54 to restrict hydraulic fluid flow through the conduit to a relatively low rate. A check valve 58 blocks hydraulic fluid flow from the variable volume chamber to the accumulator 52 through the main conduit 54. However, a restricted bleed passage 60 enables a small amount of hydraulic fluid to flow from the accumulator 52 to the upper variable volume chamber 46 in the cushion assembly 34 to compensate for any leakage of hydraulic fluid from the chamber.

The lower variable volume chamber 48 in the cushion assembly 34 is filled with a gas, specifically nitrogen. The lower variable volume chamber 48 is connected with the accumulator 52 through a conduit 64. The accumulator 52 is pressurized to maintain a predetermined minimum fluid pressure in the lower variable volume chamber 48.

During operation of the press assembly 20 from an open condition (FIG. 1) to a closed condition, the lower draw ring 26 is supported by an upwardly extending piston rod 68 connected with the piston 44. As the press assembly 20 closes, the lower draw ring 26 moves the piston 44 downwardly and decreases the size of the lower variable volume chamber 48. As the gas in the lower variable volume chamber 48 is compressed, the cushion assembly 34 applies a yieldable force against the lower draw ring 26.

As the lower draw ring 26 is moved back to its initial position, the cushion assembly 34 applies a force against the lower draw ring 26 to support the lower draw ring. As this happens, the lower variable volume chamber 48 increases in size. Although the size of the lower variable volume chamber 48 increases and the fluid pressure in the chamber 48 may tend to decrease, the fluid pressure is more than sufficient to maintain the piston 44 in the extended position shown in FIG. 1 and to support the lower draw ring 26.

Although only a single cushion assembly 34 has been shown in FIG. 1, it should be understood that there are a plurality of identical cushion assemblies to support the lower draw ring 26 and apply a yieldable force against the lower draw ring during closing of the press assembly. Thus, there is a rectangular array of cushion assemblies 34 to support the lower draw ring 26.

Control Cylinder Assembly

The control cylinder assembly 36 is operable to effect acceleration of the lower draw ring 26 in a downward direction prior to impacting of the workpiece 28 and upper draw ring 24 against the lower draw ring during operation of the press assembly 36 to the closed condition. To accomplish this, the control cylinder assembly 36 transmits force between the cushion assembly 34 and the upper draw ring 24.

The control cylinder assembly 36 includes a piston and cylinder assembly 70. The piston and cylinder assembly 70 includes a cylinder 72 disposed in the base 22 and having a vertical central axis extending parallel to a central axis of the cushion cylinder 42. A control piston 74 is disposed in the cylinder 72 and divides the cylinder into upper and lower variable volume chambers 76 and 78. The lower variable volume chamber 78 contains hydraulic fluid and is connected in fluid communication with the upper chamber 46 of the cushion assembly 34 through a conduit 80. The upper variable volume chamber 76 of the control assembly 36 is vented to the atmosphere. Although a single stage piston 74 has been shown in FIG. 1, a multiple stage piston could be used if desired.

A force transmitting member or pin 84 is engaged by a piston rod 86 connected with the control piston 74. The force transmitting member 84 transmits force between the upper draw ring 24 and the control cylinder assembly 36. The cylindrical force transmitting member 84 extends through a cylindrical opening 90 formed in the lower draw ring 26 and engages an upper end of the piston rod 86. Although it is preferred to form the force transmitting member 84 separately from the piston rod 86, it is contemplated that the piston rod 86 could be extended through the opening 90 so that the piston rod itself would function as the force transmitting member. If desired, the force transmitting member 84 and piston rod 86 could be disposed to one side of the lower draw ring 26 so that it would not be necessary to have an opening 90 extending through the lower draw ring 26. If desired, the force transmitting member 84 could be moved by a member other than the upper draw ring 24.

It should be understood that although only a single control cylinder assembly 36 has been shown in FIG. 1, there are a plurality of identical control cylinder assemblies 36 arranged in a rectangular array about the periphery of the lower draw ring 26. The plurality of control cylinder assemblies are connected in fluid communication with and operable to transmit hydraulic fluid pressure forces to a plurality of cushion assemblies 34 which are also disposed in a rectangular array about the periphery of the lower draw ring 26.

Cushion Control Valve Assembly

In accordance with one of the features of the present invention, a cushion control valve assembly 100 (FIG. 1) is provided to delay operation of the cushion assembly 40 from the retracted condition. In the absence of the cushion control valve assembly 100, the cushion assembly 40 would begin to operate from the retracted condition back toward the extended condition as soon as the press assembly 20 started to operate from the closed condition back toward the open condition. Thus, in the absence of the control valve assembly 100, the nitrogen gas pressure in the lower variable volume chamber 48 of the cushion assembly 34 would move the piston 44 upwardly to move the lower draw ring 26 upwardly with the upper draw ring 24.

As the press assembly 20 reaches the closed condition, the control valve assembly 100 is operated from the open condition shown in FIG. 1 to a closed condition blocking fluid flow from the cushion assembly 34. When the flow of fluid from the cushion assembly 34 is blocked by the closed control valve assembly 100, the cushion assembly is maintained in the retracted condition. The control valve assembly 100 is maintained in the closed condition to maintain the cushion assembly 34 retracted during at least an initial portion of the operation of the press assembly 20 toward its open condition. Therefore, the lower draw ring 26 remains stationary while the upper draw ring 24 moves upwardly away from the lower draw ring. This prevents stripping of a workpiece from a die by the lower draw ring 26 until after the upper draw ring 24 has moved upwardly clear of the workpiece 28 and lower draw ring 26.

Either before or shortly after the upper draw ring 24 reaches its upper end of stroke position, the cushion assembly control valve 100 is actuated from the closed condition back to the illustrated open condition. When this occurs, fluid can flow from the cushion assembly 34 through the control valve assembly 100 and conduit 80 to the control cylinder assembly 36. Thus, hydraulic fluid is pumped from the upper cushion chamber 46 through the now open cushion control valve assembly 100 and conduit 80 to move the control piston 74 upwardly.

The nitrogen gas pressure in the lower cushion chamber 46 constantly presses the cushion piston 44 upwardly to pressurize the hydraulic fluid in the upper variable volume chamber 46 of the cushion assembly 34. This results in fluid pressure being transmitted through the open control valve assembly 100 to the lower cylinder chamber 78 of the control cylinder assembly 36. The hydraulic fluid pressure in the lower control cylinder chamber 78 moves the piston 74 and piston rod 86 upwardly. When the cushion assembly 34 is fully extended, the lower draw ring 26 will have moved or be moving upwardly to its initial or open press position.

The cushion control valve assembly 100 may be operated between its open and closed positions at any time during a cycle of operation of the press assembly 20. In the illustrated embodiment of the invention, the control valve assembly 100 is maintained in the open condition shown in FIG. 1 until a limit switch 102 is actuated by a projection 104 connected with the lower draw ring 26. The projection 104 actuates the limit switch 102 at the end of a downward stroke of the lower draw ring 26.

The cushion control valve assembly 100 is maintained in the open condition shown in FIG. 1 as the press assembly 20 is operated from the open condition to the closed condition. Therefore, hydraulic fluid can be pumped from the lower control cylinder chamber 78 through the conduit 80 and cushion control valve assembly 100 to the cushion assembly 34 as the press assembly 20 is operated to the closed condition. A check valve assembly 106 is connected in fluid communication with the conduit 80, on opposite sides of the control valve assembly 100, to be certain that any residual hydraulic fluid in the control cylinder chamber 78 can flow through the conduit 80 after the cushion control valve assembly 100 has been closed. Thus, the operation of the press assembly 20 from the open condition to the closed condition is the same with the control valve assembly 100 as it would be in the absence of the control valve assembly.

As the press assembly 20 is operated to the closed condition and the limit switch 102 is actuated, the control valve assembly 100 is operated to its closed condition blocking fluid flow from the cushion assembly 34 to the control cylinder assembly 36. The control valve assembly 100 remains in the closed condition blocking fluid flow from the cushion assembly 34 during at least the initial portion of the operation of the press assembly 20 from the closed condition toward the open condition. Therefore, hydraulic fluid cannot flow out of the upper chamber 46 of the retracted cushion assembly 34 and the nitrogen gas pressure in the lower cylinder chamber 48 cannot operate the cushion assembly 34 toward its extended condition. Therefore, the workpiece 28 remains on the stationary lower draw ring 26.

When the press assembly 20 (FIG. 1) has been operated to a predetermined point in its operating cycle, an upper limit switch 110 is actuated by a projection 112 on the upper draw ring 24. Actuation of the limit switch 110 effects operation of the cushion control valve assembly 100 from the closed condition to the open condition.

When the control valve assembly 100 has been operated to the open condition, fluid can flow from the upper cushion cylinder chamber 46 to the lower control cylinder chamber 78. This enables the high pressure nitrogen gas in the lower cylinder chamber 48 to move the cushion piston 44 upwardly. Upward movement of the cushion piston 44 pumps hydraulic fluid from the upper cushion cylinder chamber 46 through the conduit 80 and open control valve assembly 100 into the lower cylinder chamber 78 of the control cylinder assembly 36. Of course, as fluid is pumped from the cushion assembly 34 to the control cylinder assembly 36, the control cylinder piston 74 is moved upwardly.

As the nitrogen gas pressure in the lower cushion cylinder chamber 48 moves the piston 44 upwardly to pump hydraulic fluid from the upper cushion chamber 46, the lower draw ring 26 and workpiece 28 are moved upwardly toward the upper draw ring 24. When the cushion assembly 34 has been operated back to the extended condition shown in FIG. 1, the upward movement of the draw ring 26 and workpiece 28 stop.

In the embodiment of the invention illustrated in FIG. 1, the control valve assembly 100 is operated from the closed condition to the open condition to initiate operation of the cushion assembly 34 from the retracted condition toward the extended condition as the upper draw ring 24 reaches its upper end of stroke position, that is as the upper draw ring 24 moves to its open press position. However, it is contemplated that the limit switch 110 and projection 112 on the upper draw ring 24 could be positioned to have the control valve assembly 100 operate from the closed condition to the open condition at any time during the operation of the press assembly 20 from the closed condition to the open condition. Thus, the control valve assembly 100 could be actuated from the closed condition to the open condition when the upper draw ring 24 is midway between its lower end of stroke or close press position and its upper end of stroke or open press position.

Figure 2:
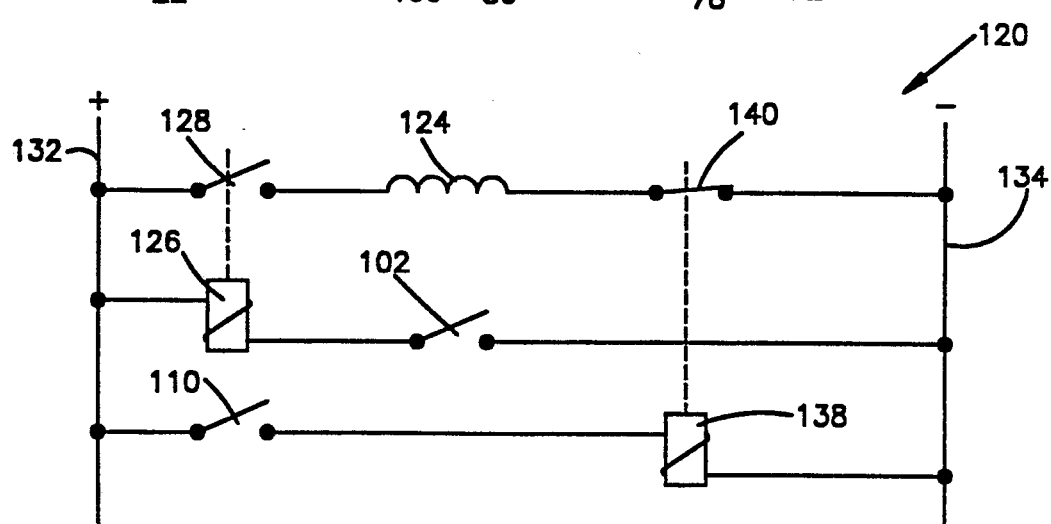
FIG. 2 is a schematic illustration of control circuitry connected with a valve for controlling fluid flow from the cushion assembly of the press assembly of FIG. 1.

The cushion control valve assembly 100 is actuated by control circuitry 120 which is illustrated schematically in FIG. 2. The control circuitry 120 includes a solenoid 124 which is connected with the valve member in the control valve assembly 100. When the solenoid 124 is in the de-energized condition shown in FIG. 2, biasing springs urge the control valve assembly 100 to the open condition shown in FIG. 1. Therefore, if, for some unforeseen reason, there should be a current failure or malfunction of the control circuitry 120, the control valve assembly 100 will be moved to its open condition by the biasing springs.

During operation of the press assembly from the open condition to the closed condition, the solenoid 124 remains de-energized and the cushion control valve assembly 100 remains open. When the press assembly 20 has been operated to its closed condition, the limit switch 102 (FIG. 1) is actuated by the projection 104 on the lower draw ring 26. Actuation or closing of the normally open limit switch 102 energizes a relay 126. Energization of the relay 126 closes normally open contacts 128 to complete a circuit between power lines 132 and 134 through the solenoid 124. Energization of the solenoid 124 operates the cushion control valve assembly 100 from the open condition As the press assembly 20 is operated from the closed condition toward the open condition, the lower draw ring 26 remains stationary and the limit switch 102 remains closed. Therefore, the solenoid 124 of the cushion control valve assembly 100 remains energized to maintain the control valve assembly in the closed condition.

As the upper draw ring 24 reaches its upper end of stroke or open press position, a projection 112 actuates the limit switch 110 (FIG. 1). Actuation of the limit switch 110 (FIG. 2) completes a circuit for energization of a relay 138 (FIG. 2). Actuation of the relay 138 opens its normally closed contacts 140 to interrupt the circuit for energizing the solenoid 124. This results in the cushion control valve assembly 100 being operated to the open condition illustrated in FIG. 1.

Operation of the cushion control valve assembly 100 to the open condition enables the fluid pressure in the lower cushion cylinder chamber 48 (FIG. 1) to move the cushion piston 44 upwardly from its retracted position. Upward movement of the cushion piston 44 pumps hydraulic fluid from the cushion assembly 34 through the open cushion control valve assembly 100 to the lower chamber 78 of the control cylinder 72. Of course, as the cushion piston 44 moves upwardly, the lower draw ring 26 also moves upwardly. As the lower draw ring 26 moves upwardly, the limit switch 102 is released and returns back to its normally open condition. When this occurs, the holding relay 126 is de-energized and its contacts 128 move to the open condition.

Upon initiation of the next operating cycle of the press assembly 20, the lower draw ring 24 moves downwardly from its upper end of stroke position. As this occurs, the limit switch 110 is released and opens the circuit for energization of the holding rely 138. This results in the contacts 140 of the relay moving to the closed condition illustrated in FIG. 2. Although the relay contacts 140 close, the solenoid 124 remains de-energized and the cushion control valve assembly 100 remains in the open condition until the limit switch 102 is actuated by downward movement of the lower draw ring 26.

Auxiliary Apparatus

In accordance with another feature of the invention, an auxiliary apparatus 150 is provided in association with the press assembly 20. The auxiliary apparatus 150 is operable to perform an operation on the workpiece 28 while the workpiece is in the press assembly 20. The auxiliary apparatus 150 is operated under the influence of energy transmitted by fluid flow from the control cylinder assembly 36 to the auxiliary apparatus 150 as the press assembly 20 is operated from its open condition to its closed condition. The auxiliary apparatus 150 can be utilized to perform any one of many different operations on the workpiece 28 while the workpiece is in the press assembly 20. Thus, the auxiliary apparatus 150 can be used to bend, cut, form holes in, or otherwise deform the workpiece 28.

The auxiliary apparatus 150 includes a cylinder 152. A piston 154 is disposed in the cylinder 152 and divides the cylinder into a head end chamber 156 and a rod end chamber 158. A piston rod 160 is connected with the piston 154. A suitable auxiliary tool 162 is mounted on the outer end of the piston rod 160.

Although the auxiliary apparatus 150 could be actuated at any desired time during the press operating cycle, in the embodiment of the invention illustrated in FIG. 1, the auxiliary apparatus 150 is operated to perform an operation on the workpiece 28 as the press assembly 20 is operated from its open condition to its closed condition. The auxiliary apparatus 120 is operated by hydraulic fluid flow from the lower chamber 78 of the control cylinder assembly 50. Thus, as the upper draw ring 24 moves downwardly and the control cylinder piston 74 is forced downwardly, hydraulic fluid flows through a conduit 166 to the head end chamber 156 of the auxiliary apparatus 150. At the same time, hydraulic fluid is being pumped from the control cylinder assembly 36 to the cushion assembly 34.

The hydraulic fluid pressure in the head end cylinder chamber 156 of the auxiliary apparatus 150 moves the piston 154 downwardly and toward the left (as viewed in FIG. 1). This moves the auxiliary tool 162 to perform an operation on the workpiece 28. As the piston 154 is moved by the hydraulic fluid pressure in the head end chamber 156, nitrogen gas in the rod end chamber 158 is compressed by the piston.

The auxiliary tool 162 is maintained in an extended condition by the hydraulic fluid pressure in the rod end chamber 156 until the press assembly 120 begins to operate from the closed condition toward the open condition. As the press assembly 20 starts to operate from the closed condition toward the open condition, the upper draw ring 24 moves upwardly away from the base 22. As this occurs, the nitrogen gas pressure in the rod end chamber 158 forces the piston 154 upwardly and toward the right (as viewed in FIG. 1). This pumps hydraulic fluid from the head end cylinder chamber 156 through the conduit 166 to the control cylinder chamber 78.

The hydraulic fluid pressure force applied against the control piston 74 is transmitted through the piston rod 86 and force transmitting member 84 to the upper draw ring 24 to urge the upper draw ring 24 upwardly. This results in the transmission of energy back to the drive assembly 32. The length of time for which hydraulic fluid is pumped from the auxiliary apparatus 150 to the control cylinder assembly 36 depends upon the volume of hydraulic fluid contained in the head end chamber 156.

In the embodiment of the invention illustrated in FIG. 1, the piston 154 of the auxiliary apparatus 150 is returned to the retracted position shown in FIG. 1 before the press assembly 20 reaches the open condition. Therefore, pumping of fluid from the auxiliary apparatus 150 and upward movement of the piston 74 is interrupted partway through operation of the press assembly from the closed condition toward the open condition. This occurs when the piston 154 in the auxiliary apparatus 150 has returned to the retracted position shown in FIG. 1. At this time, the cushion control valve assembly 100 is in the closed condition and the lower draw ring 26 is stationary.

When the press assembly 20 reaches the open condition, the cushion control valve assembly 100 is actuated from the closed condition to the open condition illustrated in FIG. 1. Hydraulic fluid is then pumped from the cushion assembly 34 to the control cylinder chamber 78 to again initiate upward movement of the control piston 74. Thus, an operating cycle of the auxiliary apparatus 150 is completed before the cushion assembly 34 completes its operating cycle.

Operation

When the press assembly 20 is in the open condition of FIG. 1, the upper draw ring 24 is spaced a substantial distance above the lower draw ring 26. The lower draw ring 26 is supported by the extended cushion assembly 34. The force transmitting member 84 projects upwardly from the upper side of the lower draw ring 26 toward the upper draw ring 24. The force transmitting member 84 is supported on the upper end of the piston rod 86 of the extended control piston and cylinder assembly 70.

The workpiece 28 is disposed between the upper and lower draw rings 24 and 26. The workpiece is supported by the lower draw ring 26 and is disposed inwardly of the force transmitting member 84. Thus, although the force transmitting member 84 extends into the opening 90 in the lower draw ring 26, the force transmitting member does not extend through the workpiece 28.

The cushion assembly 34 is maintained in the extended condition shown in FIG. 1 by fluid pressure, that is, nitrogen gas pressure, in the lower variable volume chamber 48. The gas pressure in the lower variable volume chamber 48 and accumulator 52 is more than adequate to support the lower draw ring 26 and cushion piston 44. The control cylinder assembly 36 is maintained in the extended condition shown in FIG. 1 by hydraulic fluid pressure in the lower control cylinder chamber 78. The fluid pressure in the chamber 78 is more than adequate to support the control piston 74 and force transmitting member 84.

At this time, the cushion control valve assembly 100 is in the open condition illustrated in FIG. 1. Thus, the solenoid 124 (FIG. 2) is de-energized. The limit switch 110 is held closed by the projection 112 (FIG. 1) to energize the relay 138 (FIG. 2) so that its normally closed contacts 140 are open to interrupt the circuit for energizing the solenoid 124. The limit switch 102 is in its normally open condition. Therefore the relay 126 is de-energized and its normally open contacts 128 also interrupt the circuit for energizing the solenoid 124.

When the press assembly 20 is in the open condition (FIG. 1), the auxiliary apparatus 150 is in the retracted condition. Thus, the fluid pressure, that is nitrogen gas pressure, in the rod end chamber 158 of the cylinder assembly 150 holds the piston 154 in the retracted condition shown in FIG. 1. Hydraulic fluid pressure in the head end chamber 156 of the cylinder 152 maintains an initial force against the gas in the rod end chamber 158.

As the upper draw ring 24 moves toward the lower draw ring 26, the lower side of the upper draw ring 24 engages the force transmitting member 84. As the upper draw ring moves into engagement with the force transmitting member 84, the control cylinder assembly 36 is actuated to pump hydraulic fluid through the open control valve assembly 100 to the cushion assembly 34. Thus, force is transmitted from the upper draw ring 24 to the cushion assembly 34 to initiate operation of the cushion assembly toward the retracted condition. As the cushion assembly 34 is retracted, the lower draw ring 26 and workpiece 28 are accelerated in a downward direction.

In addition, as the upper draw ring 24 moves into engagement with the force transmitting member 84, the increased hydraulic fluid pressure in the lower control cylinder chamber 78 is transmitted through the conduit 166 to the rod end chamber 156 of the auxiliary apparatus 150. This hydraulic fluid pressure causes the piston 154 to move toward its extended position to move the tool 162 toward the downwardly moving workpiece 28. Thus, both the cushion assembly 34 and the auxiliary apparatus 150 start to operate under the influence of hydraulic fluid pumped from the control cylinder assembly 36 before the upper draw ring 24 engages the workpiece 28 and lower draw ring 26.

As the upper draw ring 24 continues to move the force transmitting member 84 downwardly, the force transmitting member continues to move the control piston rod 86 downwardly. Therefore, the piston 74 continues to pump hydraulic fluid from the control cylinder chamber 78 to both cushion assembly 34 and the auxiliary apparatus 150. Thus, hydraulic fluid flow is established and maintained from the control cylinder assembly 34 through the conduit 166 to the auxiliary apparatus 150 and through the conduit 80 to the cushion assembly 34.

The fluid pressure in the upper variable volume chamber 46 of the cushion assembly 34 causes the piston 44 to move downwardly to compress the body of gas in the lower cushion chamber 48. As the piston 44 moves downwardly, the piston rod 68 and lower draw ring 26 move downwardly. This is because the lower draw ring 26 is supported on the piston rod 68 and is movable with the piston rod.

The speed of downward movement of the lower draw ring 26 is less than the speed of downward movement of the upper draw ring 24. Therefore, the upper draw ring 24 and workpiece 28 impact against the slower moving lower draw ring 26. When the upper draw ring 24 impacts against the lower draw ring 26, the workpiece 28 is gripped between the draw rings and the draw rings move downwardly together.

Since the lower draw ring 26 is moving downwardly when the upper draw ring 24 impacts against the lower draw ring, the shock loading forces on the press assembly are substantially less than would be the case if the lower draw ring 26 was stationary when the upper draw ring impacted with the lower draw ring. In addition to reducing shock loading forces, having the lower draw ring 26 move downwardly when the upper draw ring 24 closes against it reduces the amount of noise associated with operating the press assembly 20.

As the upper and lower draw rings 24 and 26 move downwardly together with the workpiece 28 gripped between them, the cushion assembly 34 and control cylinder assembly 36 are retracted at the same rate. This is because the cushion assembly piston 44 and control cylinder assembly piston 74 move downwardly with the upper and lower draw rings 24 and 26 which are moving downwardly at the same speed.

As the press assembly 20 is being operated to the closed condition, the hydraulic fluid continues to flow from the control cylinder chamber 78 to the auxiliary apparatus 150. This causes the auxiliary apparatus 150 to complete the deformation of the workpiece 28. Thus, as the press assembly 20 is closing, and the cushion assembly 34 is contracting, the auxiliary tool 162 is being moved to complete the deformation of the downwardly moving workpiece 28. Due to the hydraulic fluid pressure against the piston 154, the auxiliary tool 162 deforms the workpiece 28. As the auxiliary tool 162 is being extended, the gas in the rod end chamber 158 is being compressed by the piston 154.

When the press assembly 20 reaches its fully closed condition, the cushion assembly 34 is fully retracted. The control cylinder assembly 36 is also fully retracted. The auxiliary apparatus 150 is fully extended. The upper and lower draw rings 24 and 26 are in their lowermost positions. At this time, the workpiece 28 has been fully deformed by the combined effects of a die during a stretch drawing operation and the auxiliary apparatus 150.

As the press assembly 20 is closed and the upper and lower draw rings 24 and 26 reach their lower end of stroke positions, the projection 104 actuates the limit switch 102 to operate the cushion control valve assembly 100 to the closed condition. Thus, actuation of the normally open limit switch 102 (FIG. 2) completes the circuit for energizing the relay 126. Energization of the relay 126 closes its normally open contacts 128. At this time, the limit switch 110 is open so that the relay 138 is de-energized and its contacts 140 are closed. Therefore, the cushion control valve assembly 100 is operated from the open condition shown in FIG. 1 to the closed condition blocking the flow of hydraulic fluid from the upper chamber 46 of the cushion assembly 34.

Immediately after the press assembly 20 reaches the closed condition, the press assembly starts to operate back to the open condition. As the press assembly starts to open, the press drive assembly 32 (FIG. 1) moves the upper draw ring 24 upwardly away from the base 22.

As the upper draw ring 24 moves upwardly away from the base 22, the cushion assembly 34 remains in its retracted condition. This is because the closed cushion control valve assembly 100 blocks hydraulic fluid flow from the cushion assembly 34. Therefore, the cushion assembly 34 is hydraulically locked and the gas pressure in the lower chamber 48 cannot move the piston 44 upwardly to move the lower draw ring 26 upwardly with the upper draw ring 24. Therefore, the upper draw ring 24 moves away from the stationary workpiece 28 and lower draw ring 26.

As the upper draw ring 24 moves upwardly, the gas pressure in the rod end chamber 158 of the auxiliary apparatus 150 expands the rod end chamber and contracts the head end chamber 156. Therefore, hydraulic fluid is pumped by the piston 154 from the head end chamber 156 through the conduit 166 to the control cylinder assembly 70. This results in the auxiliary tool 162 being retracted while the lower draw ring 26 remains stationary in its open press position.

During initial upward movement of the upper draw ring 24, the retracting auxiliary apparatus 150 transmits hydraulic fluid pressure force to the control cylinder assembly 70 to move the control piston 74 upwardly. The hydraulic fluid pressure force applied against the control piston 74 is transmitted through the piston rod 86 and force transmitting member 84 to the upper draw ring 24 to urge the upper draw ring 24 upwardly. This results in the transmission of energy back to the drive assembly 32.

The rate at which fluid is pumped from the contracting auxiliary apparatus 150 to the control cylinder assembly 36 may be insufficient to continue to press the piston 74 and force transmitting member 84 upwardly against the upper draw ring 24. This is because the rate of flow of hydraulic fluid from the auxiliary apparatus 150 may be restricted by the conduit 166 and a flow control valve (not shown) provided in association with the auxiliary apparatus 150 to facilitate controlling the speed of operation of the auxiliary apparatus. However, before the upper draw ring 24 reaches its upper end of stroke or open position, the auxiliary apparatus 150 will have been returned to the retracted condition shown in FIG. 1. Therefore the flow of fluid through the conduit 166 to the control cylinder assembly 36 will have stopped before the upper draw ring 24 reaches its upper or open press position.

As the upper draw ring 24 reaches the upper end of stroke or open position shown in FIG. 1, the limit switch 110 is actuated by the projection 112. This closes the limit switch 110 to energize the relay 138 (FIG. 2). Energization of the relay 138 opens its normally closed contacts 140 to effect de-energization of the solenoid 124. De-energization of the solenoid 124 results in the control valve assembly 100 (FIG. 1) being actuated from the closed condition to the open condition.

Opening of the control valve assembly 100 enables fluid to be conducted from the cushion assembly 34 to the control cylinder assembly 36. Thus, the nitrogen gas pressure in the lower cushion chamber 48 is effective to move the cushion piston 44 upwardly from a fully retracted condition toward the fully extended condition shown in FIG. 1. Initial upward movement of the cushion piston 44 eliminates any cavitation which may have occurred in the upper cushion chamber 46.

As soon as any cavitation has been eliminated in the upper cushion chamber 46, hydraulic fluid is pumped from the upper cushion chamber through the open control valve assembly 100 and conduit 80 to the control cylinder chamber 78. This hydraulic fluid flow moves the control piston 74 upwardly. The hydraulic fluid pressure force applied against the control piston 74 is transmitted through the piston rod 86 to the force transmitting member 84. However, at this time, the upper draw ring 24 is spaced from the force transmitting member 84. Therefore, the force transmitting member 84 is ineffective to apply force against the upper draw ring 24.

The gas pressure in the lower cushion chamber 48 is constantly urging the cushion piston 44 upwardly to pressurize the hydraulic fluid in the upper variable volume chamber 46 of the cushion assembly 34. This results in the fluid pressure being transmitted through the open control valve assembly 100 and conduit 80 to the lower control cylinder chamber 78. The hydraulic fluid pressure in the lower control cylinder chamber 78 presses the piston 74 upwardly to expand the control cylinder assembly 70.

As the cushion assembly 34 is operated from the retracted condition to the extended condition shown in FIG. 1, the lower draw ring 26 is moved from its lower end of stroke or press closed position to the illustrated upper end of stroke or press open position. The upward movement of the lower draw ring 26 relative to the now stationary upper draw ring 24 is then stopped. The lower draw ring 26 then remains stationary in its upper position. Once the press assembly 20 has been operated to the open condition of FIG. 1, the deformed workpiece 28 can be readily removed from the press assembly 20.

Although it is preferred to use the cushion assembly 34, control cylinder assembly 26 and auxiliary apparatus 150 in association with the upper and lower draw rings 24 and 26, they could be used in a press assembly which does not have draw rings. If this was done, the cushion assembly 34 could be used to cushion the lower die in the press assembly. The control cylinder assembly 36 could be associated with the upper die of the press assembly. The auxiliary apparatus 150 could be used to deform the workpiece while the workpiece is in the press assembly between the upper and lower dies.

SECOND EMBODIMENT

Figure 3:
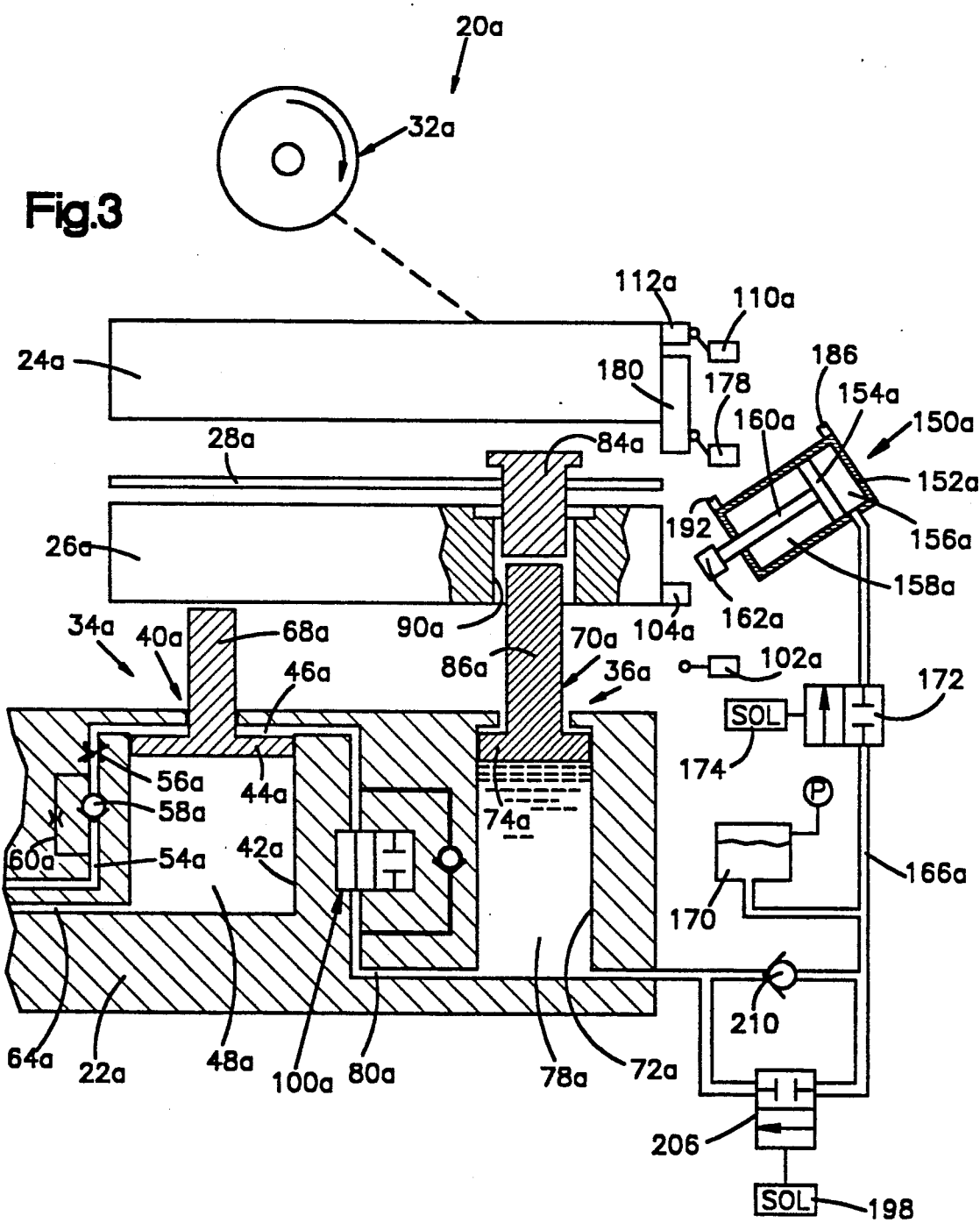
FIG. 3 is a schematic illustration, generally similar to FIG. 1, illustrating a second embodiment of the auxiliary apparatus.
Figure 4:
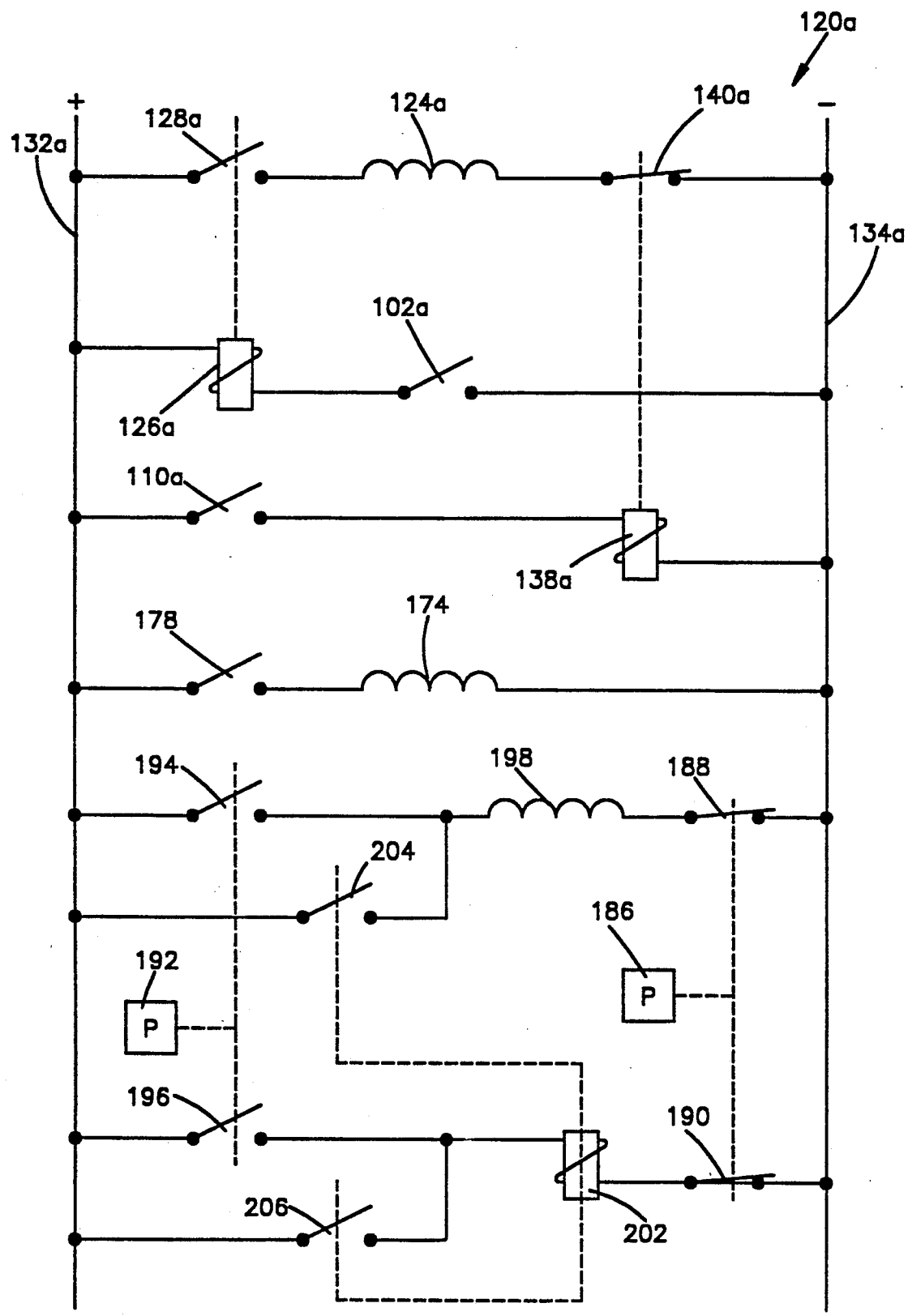
FIG. 4 is a schematic illustration of control circuitry connected with a valve for controlling fluid flow from the cushion assembly of the press assembly of FIG. 3 and with valves for controlling the operation of the auxiliary apparatus of FIG. 3.

In the embodiment of the invention illustrated in FIGS. 1 and 2, the auxiliary apparatus 150 is operated to deform the downwardly moving workpiece as the press assembly 20 is operated from the open condition to the closed condition. In the embodiment of the invention illustrated in FIGS. 3 and 4, the auxiliary apparatus is operated to deform the workpiece after the press assembly has been operated to the closed condition and while the workpiece is stationary as the press assembly is being operated toward the open condition. Since the embodiment of the invention illustrated in FIGS. 3 and 4 is generally similar to the embodiment of the invention illustrated in FIGS. 1 and 2, similar numerals will be utilized to designate similar components, the suffix letter "a" being associated with the numerals of the embodiment of the invention illustrated in FIGS. 3 and 4 to avoid confusion.

A press assembly 20a (FIG. 3) includes a stationary base 22a. An upper draw ring or member 24a cooperates with a movable draw ring or member 26a during operation of the press assembly to deform a sheet metal workpiece 28a. During operation of the press assembly 20a, the upper and lower draw rings 24a and 26a are operable to apply pressure to opposite sides of the sheet metal workpiece 28a to firmly grip the workpiece between the draw rings. Once the workpiece 28a has been gripped between the upper and lower draw rings 24a and 26a, the draw rings are lowered to deform the workpiece around a die (not shown) in a stretch forming operation.

When the press assembly 20a is operated to stretch draw the sheet metal workpiece 28a, a drive assembly 32a moves the upper draw ring 24a downwardly toward the workpiece 28a. As the downward motion of the upper draw ring 24a continues, the upper draw ring and workpiece 28a impact against the downwardly moving lower draw ring 26a to firmly grip the edges of the sheet metal workpiece. The upper and lower draw rings 24a and 26a are then lowered together to stretch form the workpiece over the lower die and thereby deform the workpiece.

A cushion assembly 34a is mounted on the base 22a. The cushion assembly 34a applies a yieldable force to the lower draw ring 26a. This yieldable force opposes downward movement of the lower draw ring 26a during operation of the press assembly to a closed condition.

A control cylinder assembly 36a is operable to effect acceleration of the lower draw ring 26a before the upper draw ring 24a closes on the lower ring. By accelerating the lower draw ring during closing of the press assembly 20a, shock loading is reduced when the upper draw ring 24a and workpiece 28a are impacted against the lower draw ring 26a.

The cushion assembly 34a includes a piston and cylinder assembly 40a. The piston and cylinder assembly 40a includes a cylinder 42a which is connected with the base 22a. A piston 44a divides the cylinder 42a into upper and lower variable volume chambers 46a and 48a. The upper variable volume chamber 46a contains hydraulic fluid and is connected in fluid communication with an accumulator 52a through a conduit 54a. The lower variable volume chamber 48a in the cushion assembly 34a is filled with a gas, specifically nitrogen. The lower variable volume chamber 48a is connected with the accumulator 52a through a conduit 64a.

The control cylinder assembly 36a is operable to effect acceleration of the lower draw ring 26a in a downward direction prior to impacting of the upper draw ring 24a against the lower draw ring and workpiece 28a during operation of the press assembly 36a to the closed condition. To accomplish this, the control cylinder assembly 36a transmits force between the cushion assembly 34a and the upper draw ring 24a.

The control cylinder assembly 36a includes a piston and cylinder assembly 70a. The piston and cylinder assembly 70a includes a cylinder 72a disposed in the base 22a. A control piston 74a is disposed in the cylinder 72a and divides the cylinder into upper and lower variable volume chambers 76a and 78a. The lower variable volume chamber 78a contains hydraulic fluid. The lower variable volume chamber 78a is connected in fluid communication with the upper chamber 46a of the cushion assembly 34a through a conduit 80a and cushion control valve assembly 100a.

A force transmitting member or pin 84a is engaged by a piston rod 86a connected with the control piston 74a. The force transmitting member 84a transmits force between the upper draw ring 24a and the control cylinder assembly 36a. The cylindrical force transmitting member 84a extends through a cylindrical opening 90a formed in the lower draw ring 26a and engages the upper end of the piston rod 86a.

An auxiliary apparatus 150a deforms the workpiece 28a while the workpiece is in the press assembly 20a. The auxiliary apparatus 150a includes a cylinder 152a containing a piston 154a. The piston 154a cooperates with the cylinder 152a to define a head end chamber 156a and a rod end chamber 158a. A piston rod 160a extends from the cylinder 152a. A tool 162a is mounted on the piston rod 160a.

In accordance with a feature of the embodiment of the invention shown in FIG. 3, the auxiliary apparatus 150a stores energy transmitted from the control cylinder assembly 36a. The auxiliary apparatus 150a includes a chamber or accumulator 170 which stores, under pressure, hydraulic fluid conducted from the control cylinder assembly 36a. The high pressure hydraulic fluid is stored the accumulator 170 until such time as the auxiliary apparatus 150a is operated to perform an operation on the workpiece 28a while the workpiece is in the press assembly 20a.

When the workpiece 28a is to be deformed by the auxiliary apparatus 150a, a valve 172 is actuated from the closed condition shown in FIG. 3 to an open condition by a solenoid 174. Energization of the solenoid 174 to actuate the auxiliary apparatus control valve 172 occurs in response to engagement of a limit switch 178 with a projection 180 on the upper draw ring 24a. This occurs as the press assembly is operated to the open condition.

Shortly before the press assembly 20a reaches the open condition, the limit switch 178 is engaged by the projection 180. Engagement of the projection 180 with the limit switch 178 completes a circuit for energizing the solenoid 174 (FIG. 4). Upon energization of the solenoid 174 (FIG. 3), the valve 172 is actuated to the open condition. Hydraulic fluid under pressure is then pumped from the chamber or accumulator 170 through the conduit 166a to the head end chamber 156a of the auxiliary piston cylinder assembly 150a.

The relatively high pressure fluid in the head end chamber 156a causes the piston 154a to move from the retracted position shown in FIG. 3 to an extended position. As this occurs, an auxiliary tool 162a engages the stationary workpiece 28a to deform the workpiece. As the piston 154a moves toward the extended condition, nitrogen gas in the rod end chamber 158a is compressed.

The auxiliary apparatus 150a is operated as the press assembly 20a operates from its closed condition to its open condition. During operation of the auxiliary apparatus 150a, the lower draw ring 26a and workpiece 28a are stationary. In addition, the cushion assembly 34a and control cylinder assembly 38a remain retracted. This is because the solenoid 124a remains energized to hold the cushion control valve 100a in the closed condition.

After the auxiliary apparatus 150a has deformed the stationary workpiece 28a and as the upper draw ring 24a moves to its upper end of stroke position, the limit switch 110a is actuated by engagement with the projection 112a. Actuation of the limit switch 110a completes a circuit for the relay 138a (FIG. 4). Therefore, the normally closed contacts 140a of the relay 138a open to effect de-energization of solenoid 124a. Upon de-energization of the solenoid 124a, the cushion control valve assembly 100a returns to its normal open condition. When the cushion control valve assembly 100a opens, fluid can flow through the conduit 80a (FIG. 3) from the cushion assembly 34a to the control cylinder assembly 38a.

Upon opening of the cushion control valve assembly 100a, high pressure nitrogen gas in the lower chamber 48a of the cushion assembly 34a moves the piston 44a upwardly. This pumps hydraulic fluid from the upper or rod end chamber 46a of the cushion assembly 40a through the open valve 100a and conduit 80a to the lower chamber 78a of the control cylinder assembly 36a. As this occurs, the lower draw ring 26a and workpiece 28a are moved upwardly from the lowered or open position toward the upper draw ring 24a. The fluid pressure in the lower chamber 78a of the control cylinder assembly 36a moves the piston 74a upwardly to operate the control cylinder assembly to its extended condition.

Immediately prior to energization of the solenoid 124a and initiation of operation of the cushion assembly 34a from the retracted condition toward the extended condition, the auxiliary apparatus 150a begins to operate from the extended condition to its retracted condition. When the control cylinder assembly 150a was previously operated from its retracted condition to its extended condition, under the influence of hydraulic fluid pressure conducted through the open valve 172, the piston 154a moved away from a proximity switch 186. This resulted in closing of contacts 188 and 190 (FIG. 4) of the proximity switch 186.

When the auxiliary piston 154a has reached its end of stroke position, immediately prior to actuation of the cushion control valve assembly 100a, a second proximity switch 192 is actuated. Actuation of the proximity switch 192 closes its normally open contacts 194 and 196 (FIG. 4). Closing of the contacts 194 of the proximity switch 192 completes a circuit for energizing a solenoid 198 through the closed contacts 188 of the proximity switch 186. In addition, closing of the contacts 196 of the proximity switch 192 completes a circuit for energizing a relay 202 to close its normally open contacts 204 and 206.

Upon energization of the solenoid 198, a valve 206 (FIG. 3) is actuated from its normally closed condition to an open condition. Opening the valve 206 enables hydraulic fluid to flow around a check valve 210 to the control cylinder assembly 36a. As this occurs, the nitrogen gas pressure in the rod end chamber 158a of the auxiliary cylinder 152a moves the piston 154a toward its retracted condition and pumps fluid through the conduit 166a to the control cylinder assembly 36a. As this occurs, the tool 162a moves away from the lower draw ring 26a and workpiece 28a to eliminate any possibility of interference as the lower draw ring begins to move upwardly from its open position toward its closed position.

As the auxiliary piston 154a moves away from the proximity switch 192, the proximity switch returns to its normal or unactuated condition. This results in the contacts 194 and 196 in the proximity switch being opened. However, the relay 202 remains energized through its own normally open contacts 206 which are now closed. When the piston 154a reaches its fully retracted end of stroke position, the proximity switch 186 is energized. Energization of the proximity switch 186 opens its closed contacts 188 and 190 to interrupt the holding circuit for the relay 202. This results in the solenoid 198 being de-energized and the valve 206 returning to its normally closed condition under the influence of biasing springs.

THIRD EMBODIMENT

Figure 5:
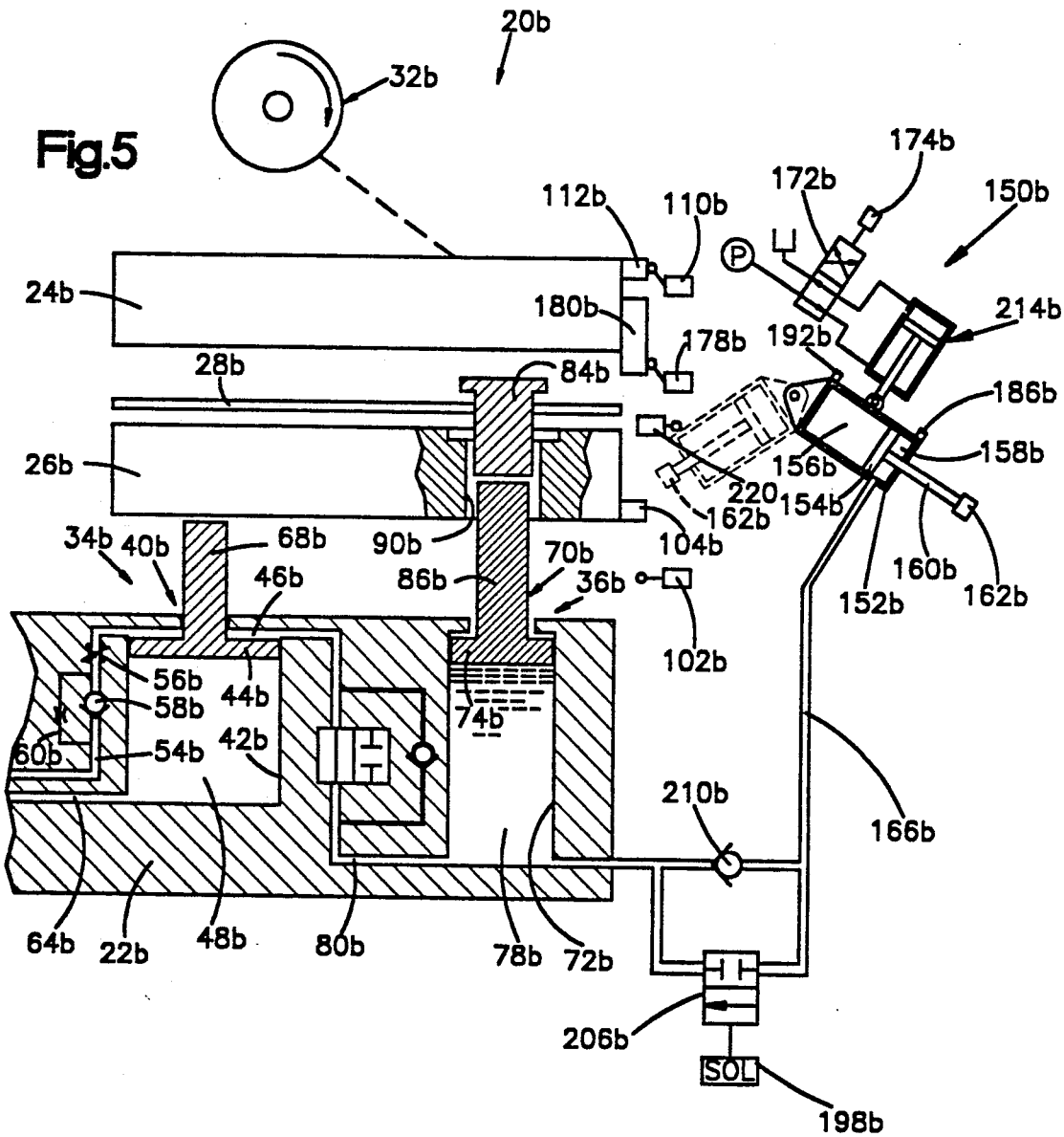
FIG. 5 is a schematic illustration, generally similar to FIG. 1, illustrating a third embodiment of the auxiliary apparatus.
Figure 6:
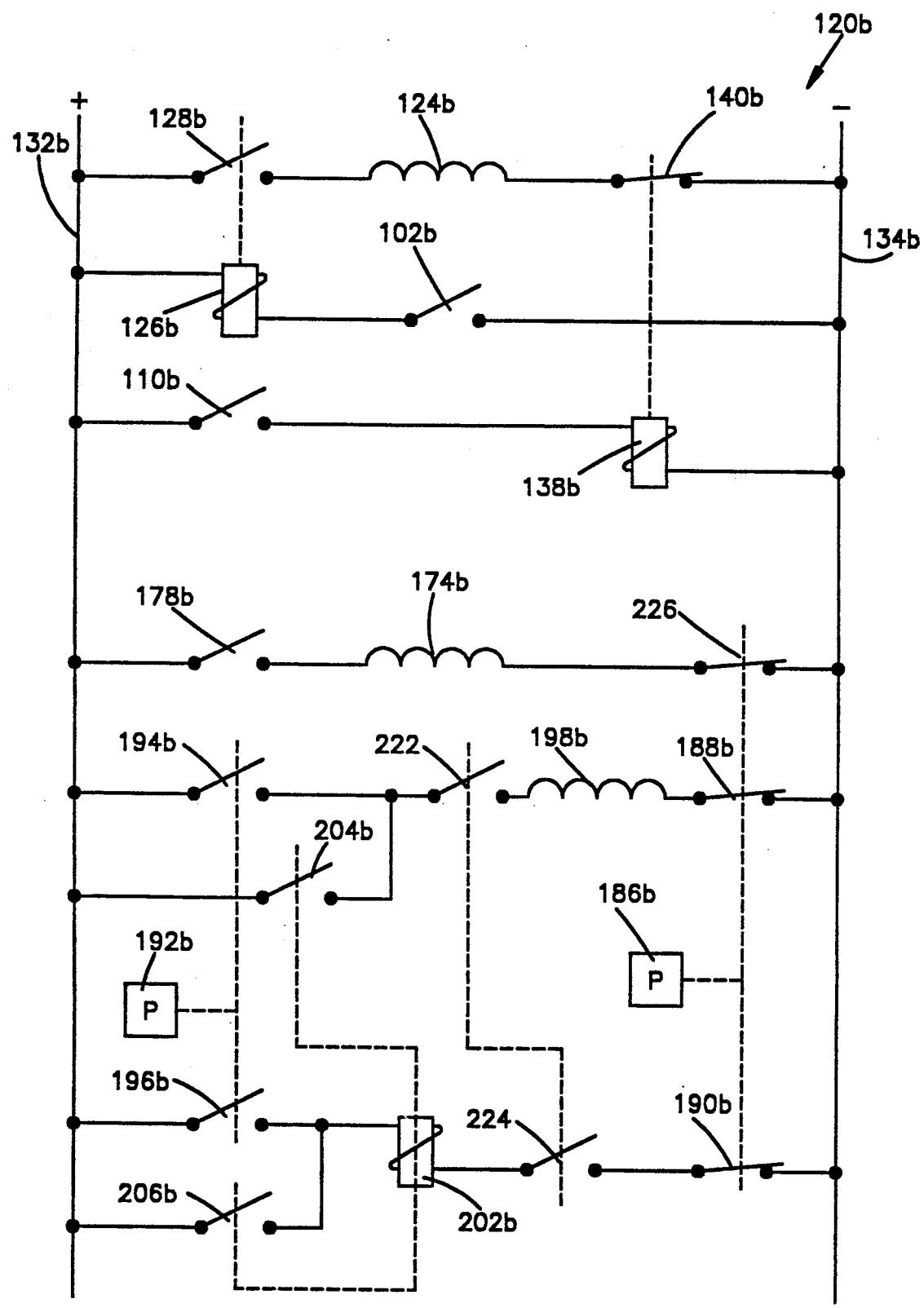
FIG. 6 is a schematic illustration of control circuitry connected with a valve for controlling fluid flow from the cushion assembly of the press assembly of FIG. 5 and with valves for controlling the operation of the auxiliary apparatus of FIG. 5.

In the embodiment of the invention illustrated in FIGS. 3 and 4, the auxiliary apparatus 150a includes an accumulator 170 which stores hydraulic fluid under pressure. In the embodiment of the invention illustrated in FIGS. 5 and 6, the auxiliary piston and cylinder assembly, itself, acts as the accumulator to store hydraulic fluid under pressure. Since the embodiment of the invention illustrated in FIGS. 5 and 6 is generally similar to the embodiment of the invention illustrated in FIGS. 3 and 4, similar numerals will be utilized to designate similar components, the suffix letter "b" being associated with the components of the embodiment of the invention shown in FIGS. 5 and 6 in order to avoid confusion.

In this embodiment of the invention, the auxiliary (shown in solid lines in FIG. 5) and an operating position (shown in dashed lines in FIG. 5) by a piston and cylinder assembly 214. During operation of the press assembly 20b from the open condition illustrated in FIG. 5 to the closed condition, the piston and cylinder assembly 214 maintains the auxiliary cylinder 152b in the nonoperating position shown in solid lines in FIG. 5. However, after the press assembly 20b has been operated to the closed condition and while the lower draw ring 26b and workpiece 28b remain stationary at their lowered or fully open position, the piston and cylinder assembly 214 is actuated to move the auxiliary cylinder 152b from the nonoperating position shown in solid lines in FIG. 5 to the operating position shown in dashed lines in FIG. 5. The auxiliary apparatus 150b is then operated to deform the stationary workpiece 28b.

As the press assembly 20b is operated from the open condition to the closed condition, the control cylinder assembly 36b pumps fluid through the check valve 210b and conduit 166b into the rod end chamber 158b of the auxiliary cylinder 152b. As hydraulic fluid is pumped into the rod end chamber 150b of the auxiliary cylinder 152b, the piston 154b is retracted along with the tool 162b. As this occurs, nitrogen gas in the head end chamber 156b is compressed by the piston 154b. Therefore, the piston 154b and cylinder 152b function as an accumulator to store hydraulic fluid under pressure in the same manner as does the accumulator 170 of FIG. 3.

At the same time that hydraulic fluid is being pumped from the control cylinder assembly 36b to the auxiliary assembly 150b, the cushion assembly 34b is being retracted by hydraulic fluid pressure pumped from the control cylinder assembly 36b through the fluid conduit 80b and open cushion control valve assembly 100b to the upper chamber 46b of the cushion assembly Hydraulic fluid pumped to the upper chamber 46b of the cushion assembly 34b retracts the cushion assembly 34b to initiate downward movement of the lower draw ring 26b prior to engagement of the upper draw ring 24b with the workpiece 28b and lower raw ring.

When the press assembly 20b begins to operate from the closed condition back toward the open condition, the cushion control valve assembly 100b will have been actuated to the closed condition, in the manner previously described for the embodiments of the invention illustrated in FIGS. 1-4. Therefore, the cushion assembly 34b remains retracted and the lower draw ring 26b and workpiece 28b will remain stationary in their lowered or closed press positions while the upper draw ring 24b moves upwardly toward its open press position.

As the upper draw ring 24b (FIG. 5) moves upwardly, the projection 180b actuates the limit switch 178b from its normally open condition to a closed condition. Actuation of the limit switch 178b completes a circuit for energizing the solenoid 174b (FIG. 6). Energization of the solenoid 174b actuates the valve 172b from an unactuated condition shown in FIG. 5, porting high pressure fluid to the rod end chamber of the piston and cylinder assembly 214 to an actuated condition porting high pressure fluid to the head end chamber of the piston and cylinder assembly 214.

The high pressure fluid conducted to the head end chamber of the piston and cylinder assembly 214 operate the piston and cylinder assembly 214 to move the auxiliary cylinder 152b from the nonoperating position shown in solid lines in FIG. 5 to the operating position shown in dashed lines in FIG. 5. When the auxiliary cylinder 152b is moved from the nonoperating position to the operating position, the piston 154b and tool 162b are retracted under the influence of the high pressure hydraulic fluid in the rod end chamber 158b.

When the auxiliary cylinder 152b reaches the operating position, a limit switch 220 is actuated. Actuation of the limit switch 220 closes its normally open contacts 222 and 224 (FIG. 6). Since the piston 154b is retracted by the hydraulic fluid pressure in the rod end chamber 158b which functions as an accumulator chamber, the proximity switch 192b will be energized and its normally open contacts 194b and 196b are closed. Therefore, upon actuation of the limit switch 220 and closing of its normally open contacts 222 and 224 (FIG. 6) a circuit is completed to energize the solenoid 198b. In addition, a circuit is completed to energize relay 202b. Energization of the relay 202b closes its normally open contacts 204b and 206b to complete circuits for maintaining the solenoid 198b energized and the holding relay 202b energized.

Upon actuation of the solenoid 198b, the valve 206b (FIG. 5) is actuated from the closed position to the open position. Opening of the valve 206b enables the hydraulic fluid pressure in the rod end chamber 158b in the conduit 166b to be conducted to the control cylinder assembly 36b. As this occurs, the high pressure gas in the head end chamber 156b moves the auxiliary piston 154b from the retracted position shown in dashed lines in FIG. 5 to an extended position. This moves the tool 162b into engagement with the stationary workpiece 28b to deform the workpiece. Thus, in the embodiment of the invention illustrated in FIGS. 5 and 6, the high pressure nitrogen gas compressed by the hydraulic fluid in the auxiliary cylinder 152b effects operation of the auxiliary apparatus 150b to deform the workpiece 28b.

Upon deformation of the stationary workpiece 28b by movement of the piston 154b from the retracted position to the extended position, the proximity switch 186b is energized. Energization of the proximity switch 186b opens its normally closed contacts 188b, 190b and 226. Opening the normally closed contacts 226 of the proximity switch 186b opens the circuit for energization of the solenoid 174b to effect operation of the valve 172b back to the unactuated position shown in FIG. 5. This results in the piston and cylinder 214 being operated to move the auxiliary cylinder 152b from the operating position shown in dashed lines in FIG. 5 back to the nonoperating position shown in solid lines in FIG. 5.

In addition, opening of the normally closed contact 188b of the proximity switch 186b effects de-energization of the solenoid 198b. This operates the valve 206b (FIG. 5) back to its normally closed position. In addition, opening of the contacts 190b of the proximity switch 186b interrupts the energization circuit for the relay 202b.

After the auxiliary motor 152b has been moved back to the nonoperating position shown in solid lines in FIG. 5, the limit switch 110b (FIG. 5) is actuated by the projection 112b. This actuates the relay 138b to open its normally closed contacts 140b. The solenoid 124b is then de-energized to effect operation of the cushion control valve assembly 110b from the closed condition to the open condition. This enables the cushion assembly 34b to be operated from the retracted condition toward the extended condition to raise the lower draw ring 26b and workpiece 28b.

CONCLUSION

The present invention relates to a press assembly 20 and method of operation of the press assembly. The press assembly 20 may have upper and lower draw rings 24 and 26 to apply pressure to opposite sides of a workpiece 28 during operation of the press assembly. When the press assembly 20 is operated from an open condition to a closed condition, the upper draw ring 24 is move downwardly toward the lower draw ring 26. Before the upper draw ring 24 impacts against the lower draw ring 26, the lower draw ring may be accelerated in a downward direction by transmitting force from the upper draw ring to a cushion assembly 34. Force transmitted from the upper draw ring 24 the cushion assembly 34 effects operation of the cushion assembly toward a retracted condition so that the lower draw ring 26 is moving downwardly when the upper draw ring impacts with the lower draw ring. Since the lower draw ring 26 is moving downwardly when it is impacted with the upper draw ring 24, shock loading is reduced.

In accordance with a feature of the invention, the cushion assembly 34 is maintained in a retracted condition during at least an initial portion of the operation of the press assembly 20 toward the open condition. To maintain the cushion assembly 34 in the retracted condition, a control valve 100 blocks fluid flow from the cushion assembly during at least the initial portion of operation of the press assembly 20 from the closed condition to the open condition. When the press assembly 20 reaches a predetermined point in its operating cycle, the control valve 100 is actuated to enable fluid to be exhausted from the cushion assembly 34.

In accordance with another feature of the present invention, an auxiliary apparatus 150 is provided to perform an operation on the workpiece 28 while the workpiece is in the press assembly 20. The auxiliary apparatus 150 is operable under the influence of energy transmitted by fluid pumped from a control cylinder assembly 36 during operation of the press assembly 20 from the open condition to the closed condition. The control cylinder assembly 36 may be actuated under the influence of force transmitted from the upper draw ring 24 or other member in the press assembly.

Having described the invention, the following is claimed:

1. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said first member being movable in a second direction opposite to the first direction during operation of said press assembly from the closed condition toward the open condition, control means for initiating movement of said second member in the first direction prior to movement of said first and second members together in the first direction during operation of said press assembly from the open condition toward the closed condition and for maintaining said cushion assembly in the retracted condition during at least an initial portion of the movement of said first member in the second direction during operation of said press assembly from the closed condition toward the open condition, and auxiliary means for performing an operation on the workpiece while the workpiece is in said press assembly, said control means including means for supplying energy during operation of said press assembly from the open condition to the closed condition to effect operation of said auxiliary means, said auxiliary means includes means for compressing fluid as said auxiliary means is operated from a first condition to a second condition during the performance of an operation on the workpiece by said auxiliary means, said auxiliary means including means operable under the influence of the compressed fluid to operate said auxiliary means from the second condition to the first condition after completion of the operation on the workpiece by said auxiliary means.

2. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said first member being movable in a second direction opposite to the first direction during operation of said press assembly from the closed condition toward the open condition, control means for initiating movement of said second member in the first direction prior to movement of said first and second members together in the first direction during operation of said press assembly from the open condition toward the closed condition and for maintaining said cushion assembly in the retracted condition during at least an initial portion of the movement of said first member in the second direction during operation of said press assembly from the closed condition toward the open condition, and auxiliary means for performing an operation on the workpiece while the workpiece is in said press assembly, said control means including means for supplying energy during operation of said press assembly from the open condition to the closed condition to effect operation of said auxiliary means, said auxiliary means includes means for storing energy supplied by said control means during operation f said press assembly from the open condition to the closed condition and means for releasing the stored energy after initiation of operation of said press assembly from the closed condition toward the open condition.

3. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said first member being movable in a second direction opposite to the first direction during operation of said press assembly from the closed condition toward the open condition, and control means for initiating movement of said second member in the first direction prior to movement of said first and second members together in the first direction during operation of said press assembly from the open condition toward the closed condition and for maintaining said cushion assembly in the retracted condition during at least an initial portion of the movement of said first member in the second direction during operation of said press assembly from the closed condition toward the open condition, said control means includes pump means for pumping fluid from said control means to said cushion assembly under the influence of force transmitted from said first member during operation of said press assembly from the open condition toward the closed condition, said cushion assembly including means for pumping fluid from said cushion assembly during operation of said cushion assembly from the retracted condition toward the extended condition, said control means including valve means for blocking fluid flow from said cushion assembly during at least the initial portion of the movement of said first member in the second direction to maintain said cushion assembly in the retracted condition.

4. A press assembly as set forth in claim 3 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

5. A press assembly as set forth in claim 3 further including auxiliary means for performing an operation on the workpiece while the workpiece is in said press assembly, said auxiliary means including means for pumping fluid from said auxiliary means to said pump means during operation of said auxiliary means through an operating cycle.

6. A press assembly as set forth in claim 5 wherein said cushion assembly includes means for compressing fluid under pressure as fluid is pumped from said control means to said cushion assembly, said cushion assembly being operable under the influence of the fluid compressed by said cushion assembly to pump fluid from said cushion assembly to said pump means during operation of said cushion assembly from the retracted condition toward the extended condition.

7. A press assembly as set forth in claim 6 wherein said auxiliary means is operable to pump fluid from said auxiliary means to said pump means upon completion of an operation on a workpiece by said auxiliary means.

8. A press assembly as set forth in claim 6 wherein said auxiliary means is operable to pump fluid from said auxiliary means to said pump means during performance of an operation on a workpiece by said auxiliary means.

9. A press assembly as set forth in claim 5 wherein said auxiliary means includes valve means for blocking fluid flow from said auxiliary means to said pump means during operation of said press assembly from the open condition to the closed condition, said valve means being operable from a first condition to a second condition to enable fluid to flow from said auxiliary means to said pump means.

10. A press assembly as set forth in claim 5 wherein said control means includes means for effecting operation of said pump means under the influence of force transmitted from said first member during operation of said press assembly from the open condition toward the closed condition.

11. A press assembly as set forth in claim 3 wherein said control means includes control valve means for blocking fluid flow from said cushion assembly to said pump means during at least an initial portion of the operation of said press assembly from the closed condition toward the open condition.

12. A press assembly as set forth in claim 11 wherein said control means includes means for effecting operation of said control valve means from a first condition blocking fluid flow to a second condition enabling fluid to flow in response to said first member moving to a predetermined position during operation of said press assembly from the closed condition to the open condition.

13. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said first member being movable in a second direction opposite to the first direction during operation of said press assembly from the closed condition toward the open condition, control means for initiating movement of said second member in the first direction prior to movement of said first and second members together in the first direction during operation of said press assembly from the open condition toward the closed condition and for maintaining said cushion assembly in the retracted condition during at least an initial portion of the movement of said first member in the second direction during operation of said press assembly from the closed condition toward the open condition, auxiliary means for performing an operation on the workpiece while the workpiece is in said press assembly, said control means including pump means for pumping fluid from said control means to said cushion assembly and to said auxiliary means during operation of said press assembly from the open condition toward the closed condition, said cushion assembly including means for pumping fluid from said cushion assembly to said pump means during operation of said cushion assembly from the retracted condition toward the extended condition, said auxiliary means including means for pumping fluid from said auxiliary means to said pump means during operation of said auxiliary means through an operating cycle.

14. A press assembly as set forth in claim 13 wherein said cushion assembly includes means for storing energy as fluid is pumped from said control means to said cushion assembly, said cushion assembly being operable under the influence of the stored energy to pump fluid from said cushion assembly to said pump means during operation of said cushion assembly from the retracted condition toward the extended condition, said auxiliary means including means for storing energy as fluid is pumped from said control means to said auxiliary means, said auxiliary means being operable under the influence of the energy stored by said auxiliary means to pump fluid from said auxiliary means to said pump means during operation of said auxiliary means through an operating cycle.

15. A press assembly as set forth in claim 14 wherein said auxiliary means is operable to pump fluid from said auxiliary means to said pump means upon completion of an operation on a workpiece by said auxiliary means.

16. A press assembly as set forth in claim 13 wherein said cushion assembly includes means for compressing fluid under pressure as fluid is pumped from said control means to said cushion assembly, said cushion assembly being operable under the influence of the fluid compressed by said cushion assembly to pump fluid from said cushion assembly to said pump means during operation of said cushion assembly from the retracted condition toward the extended condition, said auxiliary means including means for compressing fluid under pressure as fluid is pumped from said control means to said auxiliary means, said auxiliary means being operable under the influence of the fluid compressed by said auxiliary means to pump fluid from said auxiliary means to said pump means during operation of said auxiliary means through an operating cycle.

17. A press assembly as set forth in claim 13 wherein said auxiliary means is operable to pump fluid from said auxiliary means to said pump means upon completion of an operation on a workpiece by said auxiliary means.

18. A press assembly as set forth in claim 13 wherein said auxiliary means is operable to pump fluid from said auxiliary means to said pump means during performance of an operation on a workpiece by said auxiliary means.

19. A press assembly as set forth in claim 13 wherein said auxiliary means includes valve means for blocking fluid flow from said auxiliary means to said pump means during operation of said press assembly from the open condition to the closed condition, said valve means being operable from a first condition to a second condition to enable fluid to flow from said auxiliary means to said pump means after operation of said press assembly from the open condition to the closed condition.

20. A press assembly as set forth in claim 13 wherein said control means includes means for effecting operation of said pump means under the influence of force transmitted from said first member during operation of said press assembly from the open condition toward the closed condition.

21. A press assembly as set forth in claim 13 wherein said control means includes control valve means for blocking fluid flow from said cushion assembly to said pump means during at least an initial portion of the operation of said press assembly from the closed condition toward the open condition, said auxiliary means including auxiliary valve means for blocking fluid flow from said auxiliary means to said pump means during at least a portion of an operating cycle of said auxiliary means.

22. A press assembly as set forth in claim 21 wherein said control means includes means for effecting operation of said control valve means from a first condition blocking fluid flow to a second condition enabling fluid to flow in response to said first member moving to a predetermined position during operation of said press assembly from the closed condition to the open condition.

23. A press assembly as set forth in claim 22 wherein said auxiliary means includes means for effecting operation of said auxiliary valve means from a first condition blocking fluid flow to a second condition enabling fluid to flow in response to said first member moving to a predetermined position during operation of said press assembly from the closed condition to the open condition.

24. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said first member being movable in a second direction opposite to the first direction during operation of said press assembly from the closed condition toward the open condition, control means for initiating movement of said second member in the first direction prior to movement of said first and second members together in the first direction during operation of said press assembly from the open condition toward the closed condition and for maintaining said cushion assembly in the retracted condition during at least an initial portion of the movement of said first member in the second direction during operation of said press assembly from the closed condition toward the open condition, auxiliary means for performing an operation on the workpiece, said control means including means for supplying fluid under pressure to said cushion assembly to effect operation of said cushion assembly from the extended condition toward the retracted condition and for supplying fluid under pressure to said auxiliary means and control valve means operable between a first condition blocking fluid flow between said cushion assembly and said control means and a second condition enabling fluid to flow between said cushion assembly and said control means, said auxiliary means including auxiliary valve means operable between a first condition blocking fluid flow and a second condition enabling fluid to flow between said auxiliary means and said control means.

25. A press assembly as set forth in claim 24 wherein said control means includes means for supplying fluid under pressure to said cushion assembly and auxiliary means under the influence of force transmitted from said first member during operation of said press assembly from the open condition toward the closed condition.

26. A press assembly as set forth in claim 24 wherein said control valve means blocks fluid flow from said cushion assembly during at least an initial portion of the operation of said press assembly from the closed condition toward the open condition, said auxiliary valve means blocking fluid flow from said auxiliary means during at least a portion of an operating cycle of said auxiliary means.

27. A press assembly as set forth in claim 24 wherein said control valve means is in the first condition blocking fluid flow from said cushion assembly to maintain said cushion assembly in the retracted condition during at least a portion of the movement of said first member in the second direction.

28. A press assembly as set forth in claim 24 wherein said auxiliary means performs an operation on the workpiece while the workpiece is in said press assembly.

29. A press assembly as set forth in claim 28 wherein said auxiliary means is operable from a first condition to a second condition to engage the workpiece while the workpiece is disposed between said first and second members during the performance of an operation on the workpiece by said auxiliary means, said auxiliary means being operable from the second condition to the first condition after completion of the operation on the workpiece by said auxiliary means and while the workpiece is disposed between said first and second members.

30. A press assembly as set forth in claim 29 wherein said auxiliary means includes means for storing energy supplied by said control means during operation of said press assembly from the open condition to the closed condition and means for releasing the stored energy after initiation of operation of said press assembly from the closed condition toward the open condition.

31. A press assembly as set forth in claim 24 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

32. A press assembly as set forth in claim 24 wherein said control means includes means for effecting operation of said control valve means between the first and second conditions in response to one of said first and second members moving to a predetermined position during operation of said press assembly, said auxiliary means including means for effecting operation of said auxiliary valve means between the first and second conditions in response to one of said first and second members moving to a predetermined position during operation of said press assembly.

33. A press assembly as set forth in claim 24 wherein said control valve means blocks fluid flow from said cushion assembly to said control means when said control valve means is in the first condition and wherein said control valve means enables fluid to flow from said cushion assembly to said control means when said control valve means is in the second condition.

34. A press assembly as set forth in claim 24 wherein said auxiliary valve means blocks fluid flow from said auxiliary means to said control means when said auxiliary valve means in the first condition and wherein said auxiliary valve means enables fluid to flow from said auxiliary means to said control means when said auxiliary valve means is in the second condition.

35. A method comprising the steps of operating a press assembly from an open condition to a closed condition to deform a workpiece and operating the press assembly from the closed condition to the open condition to facilitate removal of the deformed workpiece from the press assembly, said step of operating the press assembly from an open condition to a closed condition including moving a first member from a first position toward a second member disposed in a second position with at least a portion of the workpiece disposed between the first and second members, operating a cushion assembly from an extended condition toward a retracted condition to move the second member away from the second position, thereafter, impacting the workpiece and first member against the second member while the second member is moving away from the second position, thereafter, moving the first and second members together in a direction away from the second position to their closed press positions with at least a portion of the workpiece disposed between the first and second members, and operating the cushion assembly to the retracted condition as the first and second members move to their closed press positions, said step of operating the press assembly from the closed condition to the open condition including moving the first member toward the first position, maintaining the cushion assembly in the retracted condition and said second member stationary in its closed pres position during at least a portion of the movement of the first member toward the first position, and, thereafter operating the cushion assembly from the retracted condition to the extended condition to move the second member to the second position, said step of operating a cushion assembly from an extended condition toward a retracted condition includes pumping fluid to the cushion assembly under the influence of force transmitted from said first member during movement of the first member from the first position and operating of the press assembly toward the closed condition, said step of maintaining the cushion assembly in the retracted condition and the second member in its press closed position including blocking fluid flow from the cushion assembly during at least a portion of the movement of the first member toward the first position.

36. A method as set forth in claim 35 further including the step of operating an auxiliary apparatus to deform the workpiece, said step of operating the auxiliary apparatus to deform the workpiece being at least partially performed while the first and second members are moving together toward their closed press positions.

37. A method as set forth in claim 35 further including the step of operating an auxiliary apparatus to deform the workpiece while the second member is stationary in its closed press position.

38. A method as set forth in claim 35 further including the step of operating an auxiliary apparatus to deform the workpiece, said step of operating an auxiliary apparatus to deform the workpiece being at least partially performed while the first member is moving toward the first position.

39. A method as set forth in claim 35 further including the step of operating an auxiliary apparatus to deform the workpiece, said step of operating an auxiliary apparatus being at least partially performed during performance of said step of blocking fluid flow from the cushion assembly.

40. A method as set forth in claim 35 further including the step of operating an auxiliary apparatus to deform the workpiece while the workpiece is in the press assembly and prior to initiating performance of said step of operating the cushion assembly from the retracted condition.

41. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, auxiliary means for performing an operation on the workpiece while the workpiece is disposed between said first and second members, and control means operable under the influence of force transmitted from said first member to pump fluid to said auxiliary apparatus to provide energy which effects operation of said auxiliary apparatus to perform an operation on the workpiece.

42. An apparatus as set forth in claim 41 wherein said auxiliary means initiates performance of an operation on the workpiece while said first and second members are moving together in the first direction during operation of said press assembly from the open condition toward the closed condition.

43. An apparatus as set forth in claim 41 wherein said auxiliary means initiates performance of an operation on the workpiece while said second member is stationary and said cushion assembly is in the retracted condition.

44. An apparatus as set forth in claim 41 wherein said auxiliary means initiates performance of an operation on the workpiece during operation of said press assembly from the closed condition toward the open condition.

45. An apparatus as set forth in claim 41 wherein said auxiliary means includes means for storing fluid under pressure during operation of said control means to pump fluid to said auxiliary means, said auxiliary means including means for releasing the stored fluid under pressure to provide the energy which effects operation of said auxiliary apparatus to perform an operation on the workpiece.

46. An apparatus as set forth in claim 41 wherein said auxiliary means includes fluid motor means for receiving fluid pressure resulting from the pumping of fluid by said control means to effect operation of said auxiliary means to perform an operation on the workpiece.

47. An apparatus as set forth in claim 41 further including valve means operable from an open condition to a closed condition of block fluid flow from said cushion assembly to maintain said cushion assembly in the retracted condition during at least an initial portion of the operation of said press assembly from the closed condition to the open condition, said auxiliary means being operable to at least partially perform an operation on the workpiece while said valve means is in the closed condition.

48. An apparatus as set forth in claim 41 wherein said control means is operable from a first condition to a second condition to pump fluid to said cushion assembly during operation of said press assembly from the open condition to the closed condition, said control means being operable from the second condition to the first condition under the influence of fluid conducted from said cushion assembly during operation of said cushion assembly from the retracted condition to the extended condition.

49. An apparatus as set forth in claim 41 wherein said cushion assembly includes wall means for defining a cylinder chamber, a piston disposed in said cylinder chamber and dividing said cylinder chamber into first and second variable volume chambers, said first variable volume chamber containing a gas, said second variable volume chamber containing hydraulic fluid, said control means including means for increasing the hydraulic fluid pressure in said second variable volume chamber to move said piston to increase the volume of said second variable volume chamber and decrease the volume of said first variable volume chamber during operation of said press assembly from the open condition toward the closed condition.

50. A press assembly as set forth in claim 41 wherein said control means includes wall means for defining a cylinder chamber, a piston disposed in said cylinder chamber, means for transmitting force from said first member to said piston to pressurize fluid in said cylinder chamber, and means for conducting fluid pressure from said cylinder chamber to said auxiliary means and to said cushion assembly, said cushion assembly including means for effecting operation of said cushion assembly toward the retracted condition under the influence of fluid pressure conducted from said cylinder chamber.

51. A press assembly as set forth in claim 41 wherein said first movable member is an upper draw ring and said second movable member is a lower draw ring, said upper and lower draw rings being disposed in abutting engagement with opposite sides of the workpiece to grip the workpiece during operation of said press assembly toward the closed condition.

52. A press assembly as set forth in claim 41 wherein said auxiliary means includes accumulator means for holding hydraulic fluid under pressure during operation of said press assembly from the open condition to the closed condition, an auxiliary piston and cylinder assembly operable under the influence of hydraulic fluid pressure conducted from said accumulator means, and valve means operable from a closed condition of an open condition to enable hydraulic fluid flow to occur between said accumulator means and said auxiliary piston and cylinder assembly to effect operation of said auxiliary means.

53. A press assembly as set forth in claim 41 wherein said auxiliary means includes a housing having a first chamber for holding gas and a second chamber for holding hydraulic fluid, and a piston disposed in said housing, said piston being movable against the influence of the gas in the first chamber of said auxiliary cylinder under the influence of hydraulic fluid pressure conducted from said control means to the second chamber of said auxiliary cylinder to store energy to effect operation of said auxiliary apparatus.

54. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said first member being movable in a second direction opposite to the first direction during operation of said press assembly from the closed condition toward the open condition, auxiliary means for performing an operation on the workpiece while the workpiece is disposed between said first and second members, and control means for pumping fluid to said auxiliary means under the influence of force transmitted from one of said first and second members during operation of said press assembly from the open condition to the closed condition, said control means including a control cylinder and a control piston disposed in said control cylinder, said control cylinder and control piston being relatively movable under the influence of force transmitted from said one of said first and second members, said auxiliary means including an auxiliary cylinder, an auxiliary piston and conduit means for conducting fluid pressure resulting from relative movement between said control cylinder and said control piston to auxiliary cylinder.

55. A press assembly as set forth in claim 54 wherein said auxiliary piston divides said auxiliary cylinder to form a first chamber for holding gas and a second chamber for holding hydraulic fluid, said auxiliary piston being movable against the influence of the gas in the first chamber of said auxiliary cylinder under the influence of hydraulic fluid pressure conducted from said control means to the second chamber of said auxiliary cylinder to store energy to effect operation of said auxiliary means.

56. A press assembly as set forth in claim 54 wherein said auxiliary means further includes accumulator means for holding hydraulic fluid under pressure during operation of said press assembly from the open condition to the closed condition, said auxiliary piston and cylinder being relatively movable under the influence of hydraulic fluid pressure conducted from said accumulator means, and valve means operable from a closed condition to an open condition to enable hydraulic fluid flow to occur between said accumulator means and said auxiliary cylinder to effect operation of said auxiliary means.

57. A press assembly as set forth in claim 54 wherein said control means is operable to pump fluid to said cushion assembly to effect movement of said second member in the first direction prior to movement of said first and second members together in the first direction during operation of said press assembly from the open condition toward the closed condition.

58. A press assembly as set forth in claim 57 wherein said control means includes means for maintaining said cushion assembly in the retracted condition during at least an initial portion of the movement of said first member in the second direction during operation of said press assembly from the closed condition toward the open condition.

59. A press assembly as set forth in claim 54 wherein said control means includes means for conducting fluid pressure from said control cylinder to said cushion assembly, said cushion assembly including means for effecting operation of said cushion assembly toward the retracted condition under the influence of fluid pressure conducted from said cylinder chamber.

60. A press assembly as set forth in claim 54 wherein said first movable member is an upper draw ring and said second movable member is a lower draw ring, said upper and lower draw rings being disposed in abutting engagement with opposite sides of the workpiece to grip the workpiece during operation of said press assembly toward the closed condition.

61. A press assembly as set forth in claim 54 wherein said cushion assembly includes wall means for defining a cushion cylinder chamber, a cushion piston disposed in said cushion cylinder chamber and dividing said cushion cylinder chamber into first and second variable volume chambers, said first variable volume chamber containing a gas, said second variable volume chamber containing hydraulic fluid, said control means including means for conducting fluid pressure from said control cylinder to said second variable volume chamber to increase the hydraulic fluid pressure in said second variable volume chamber to move said cushion piston to increase the volume of said second variable volume chamber and decrease the volume of said first variable volume chamber during operation of said press assembly from the open condition toward the closed condition.

62. A press assembly as set forth in claim 54 wherein said control cylinder and control piston are movable relative to each other from a first condition to a second condition to pump fluid to said cushion assembly during operation to said press assembly from the open condition to the closed condition, said control cylinder and control piston being movable relative to each other under the influence of fluid conducted from said cushion assembly during operation of said cushion assembly from the retracted condition to the extended condition.

63. A press assembly as set forth in claim 54 further including valve means operable from an open condition to a closed condition to block fluid flow from said cushion assembly to maintain said cushion assembly in the retracted condition during at least an initial portion of the operation of said press assembly from the closed condition to the open condition, said auxiliary means being operable to at least partially perform an operation on the workpiece while said valve means is in the closed condition.

64. A press assembly as set forth in claim 54 wherein said auxiliary means initiates performance of an operation on the workpiece during operation of said press assembly from the closed condition toward the open condition.

65. A press assembly as set forth in claim 54 wherein said auxiliary means initiates performance of an operation on the workpiece while said second member is stationary and said cushion assembly is in the retracted condition.

66. An press assembly as set forth in claim 54 wherein said auxiliary means initiates performance of an operation on the workpiece while said first and second members are moving together in the first direction during operation of said press assembly from the open condition toward the closed condition.

67. A method comprising the steps of operating a press assembly from an open condition to a closed condition to deform a workpiece and operating an auxiliary apparatus to perform an operation on the workpiece while the workpiece is in the press assembly, and operating the press assembly from the closed condition to the open condition to facilitate removal of the deformed workpiece from the press assembly, said step of operating the press assembly from an open condition to a closed condition including moving a first member from a first position toward a second member disposed in a second position with at least a portion of the workpiece disposed between the first and second members, impacting the workpiece and first member against the second member with at least a portion of the workpiece disposed between the first and second members, thereafter, moving the first and second members together in a direction away from the second position to their closed press positions with at least a portion of the workpiece disposed between the first and second members, operating the cushion assembly to the retracted condition under the influence of force transmitted from the second member as the first and second members move to their closed press positions, and pumping fluid to the auxiliary apparatus under the influence of force transmitted from one of the first and second members, said step of operating the auxiliary apparatus to perform an operation on the workpiece being performed under the influence of energy provided by said pumping of fluid to the auxiliary apparatus, said step of operating the press assembly from the closed condition to the open condition including moving the first member toward the first position and operating the cushion assembly from the retracted condition to the extended condition to move the second member to the second position.

68. A method as set forth in claim 67 wherein said step of operating a cushion assembly from an extended condition toward a retracted condition includes pumping fluid to the cushion assembly under the influence of force transmitted from one of said first and second members during operation of the press assembly toward the closed condition.

69. A method as set forth in claim 68 wherein said step of operating the press assembly from the closed condition to the open condition includes maintaining the cushion assembly in the retracted condition and the second member in its press closed position by blocking fluid flow from the cushion assembly during at least a portion of the movement of the first member toward the first position.

70. A method as set forth in claim 67 wherein said step of operating an auxiliary apparatus is performed prior to initiating performance of said step of operating the cushion assembly from the retracted condition.

71. A method as set forth in claim 67 wherein said step of operating an auxiliary apparatus is at least partially performed during movement of said first and second members together toward their closed press positions.

72. A method as set forth in claim 67 wherein said step of operating an auxiliary apparatus to perform an operation on the workpiece is at least partially performed while said second member is stationary and the cushion assembly is in the retracted condition.

73. A method as set forth in claim 67 wherein said step of operating an auxiliary apparatus is at least partially performed during operation of said press assembly from he closed condition toward the open condition.

74. A method as set forth in claim 67 wherein said step of operating an auxiliary apparatus includes storing fluid under pressure provided by performance of said step of pumping fluid to the auxiliary apparatus, said step of operating the auxiliary apparatus to perform an operation on the workpiece including releasing the stored fluid under pressure to provide energy to effect operation of the auxiliary apparatus.

75. A method as set forth in claim 67 wherein said step of operating the press assembly from the closed condition to the open condition includes maintaining the cushion assembly in the retracted condition and the second member stationary during at least a portion of the movement of the first member toward the first position, said step of operating the auxiliary apparatus being at least partially performed while the second member is stationary and the first member is moving toward the first position.

76. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, auxiliary means for performing an operation on the workpiece while the workpiece is in the press assembly, and means for pumping fluid to said cushion assembly to initiate operation of said cushion assembly toward the retracted condition prior to movement of said first and second members together in the first direction during operation of said press assembly from the open condition toward the closed condition and for pumping fluid to said auxiliary means during operation of said press assembly from the open condition toward the closed condition under the influence of force transmitted from said first member during operation of said press assembly from the open condition to the closed condition.

77. A press assembly as set forth in claim 76 wherein said auxiliary means is operable between a first condition and a second condition during an operating cycle of said auxiliary means, said auxiliary means includes an auxiliary cylinder having a first chamber for holding gas and a second chamber for holding hydraulic fluid, a piston disposed in said auxiliary cylinder, said piston being movable under the influence of hydraulic fluid pressure in said second chamber to compress the gas in said first chamber during operation of said auxiliary means from the first condition to the second condition, said piston being movable under the influence of gas pressure in said first chamber during operation of said auxiliary means from the second condition to the first condition.

78. A press assembly as set forth in claim 76 further including first conduit means for conducting fluid flow from said means for pumping fluid to said cushion assembly during at least a portion of the operation of said press assembly from the open condition to the closed condition and second conduit means for conducting fluid flow from said means for pumping fluid to said auxiliary means during at least a portion of the operation of said press assembly from the open condition to the closed condition.

79. A press assembly as set forth in claim 78 wherein said auxiliary means includes chamber means for holding hydraulic fluid under pressure and valve means operable from a closed condition blocking a flow of hydraulic fluid from said chamber means to an open condition to enable hydraulic fluid to flow from said chamber means, said auxiliary means being operable to perform an operation on the workpiece during the flow of hydraulic fluid from said chamber means.

80. A press assembly as set forth in claim 79 further including control means for maintaining said valve means in the closed condition blocking fluid flow from said chamber means during at least a portion of the operation of said press assembly from the closed condition to the open condition.

81. A press assembly as set forth in claim 79 wherein auxiliary means includes a piston and cylinder motor and second valve means for blocking fluid flow from said chamber means to said piston and cylinder motor during at least a portion of the operation of said press assembly from the closed condition to open condition.

82. A press assembly as set forth in claim 79 wherein said auxiliary means includes a motor cylinder, said chamber means being disposed in said motor cylinder.

83. A press assembly as set forth in claim 76 further including valve means for blocking fluid flow from said cushion assembly during at least an initial portion of the operation of said press assembly from the closed condition to the open condition to maintain said cushion assembly in the retracted condition.

84. A press assembly as set forth in claim 76 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

85. A press assembly as set forth in claim 76 wherein said means for pumping fluid includes a control cylinder, a control piston disposed in said control cylinder, and means for transmitting force from said first member to said control piston to move said control piston relative to said control cylinder.

86. A press assembly as set forth in claim 85 further including first conduit means for conducting fluid flow from said control cylinder to said cushion assembly during at least a portion of the movement of said control piston relative to said control cylinder under the influence of force transmitted from said first member, and second conduit means for conducting fluid flow from said control cylinder to said auxiliary means during at least a portion of the movement of said control piston relative to said control cylinder under the influence of force transmitted from said first member.

87. A press assembly as set forth in claim 86 wherein said cushion assembly includes means for pumping fluid from said cushion assembly to said control cylinder through said first conduit means during operation of said cushion assembly from the retracted condition toward an extended condition, said auxiliary means including means for pumping fluid from said auxiliary means to said control cylinder through said second conduit means during operation of said auxiliary means through an operating cycle.

88. A press assembly as set forth in claim 87 wherein said auxiliary means is operable between a first condition and a second condition during performance of an operation on a workpiece, said auxiliary means including an auxiliary cylinder having a first chamber for holding gas and a second chamber for receiving fluid from said second conduit means, an auxiliary piston disposed in said auxiliary cylinder, said auxiliary piston being movable under the influence of fluid pressure in said second chamber to compress the gas in said first chamber during operation of said auxiliary means from the first condition to the second condition, said auxiliary piston being movable under the influence of gas pressure in said first chamber to pump fluid from said auxiliary cylinder into said second conduit means during operation of said auxiliary means through an operating cycle.

89. An apparatus as set forth in claim 88 wherein said cushion assembly includes a cushion cylinder having a first chamber for holding gas and a second chamber for receiving fluid from said first conduit means, a cushion piston disposed in said cushion cylinder, said cushion piston being movable to compress the gas in said first chamber of said cushion cylinder during operation of said press assembly from the open condition to the closed condition, said cushion piston be movable under the influence of gas pressure in said first chamber of said cushion cylinder during operation of said cushion assembly from the retracted condition toward the extended condition to pump fluid from said cushion cylinder into said first conduit means during operation of said cushion assembly form the retracted condition toward the extended condition.

90. A press assembly a set forth in claim 76 further including first conduit means for conducting fluid from said mean for pumping fluid to said cushion assembly during operation of said press assembly from the open condition to the closed condition and for conducting fluid from said cushion assembly to said means for pumping fluid during operation of said cushion assembly from the retracted condition to an extended condition, and second conduit means for conducting fluid from said means for pumping fluid to said auxiliary means during operation of said press assembly from the open condition to the closed condition and for conducting fluid from said auxiliary means to said means for pumping fluid during an operating cycle of said auxiliary means.

91. A press assembly as set forth in claim 90 further including first valve means for blocking fluid flow from said cushion assembly through said first conduit means to said means for pumping fluid during at least an initial portion of the operation of said press assembly from the closed condition toward the open condition, and second valve means for blocking fluid flow from said auxiliary means through said second conduit means to said means for pumping fluid during at least a portion of an operating cycle of said auxiliary means.

92. A press assembly as set forth in claim 91 further including means for effecting operation of said first valve means from a first condition blocking fluid flow through said first conduit means to a second condition enabling fluid to flow through said first conduit means in response to said first member moving to a predetermined position during operation of said press assembly from the closed condition to the open condition, and means for effecting operation of said second valve means from a first condition blocking fluid flow through said second conduit means to a second condition enabling fluid to flow through said second conduit means in response to one of said first and second members moving to a predetermined position during operation of said press assembly from the closed condition t the open condition.

93. A press assembly operable from an open condition to a closed condition to deform a workpiece, said press assembly including a first movable member for engaging a first side of the workpiece during operation of said press assembly, a second movable member for engaging a second side of the workpiece during operation of said press assembly, said first member being movable toward said second member during operation of said press assembly from the open condition to the closed condition, said first member being movable away from said second member during operation of said press assembly from the closed condition to the open condition, a control cylinder, a first piston disposed in said control cylinder, a cushion cylinder having a first chamber for holding gas and a second chamber for holding hydraulic fluid, a second piston disposed in said cushion cylinder, conduit means for conducting hydraulic fluid flow from said control cylinder to said second chamber of said cushion cylinder during operation of said press assembly from the open condition to the closed condition and for conducting hydraulic fluid flow from said second chamber of said cushion cylinder to said control cylinder, and valve means operable between an open condition and a closed condition blocking fluid flow through said conduit means, said valve means being in the open condition to enable hydraulic fluid flow to be established from said control cylinder through said conduit means to said second chamber of said cushion cylinder during at least a portion of the operation of said press assembly from the open condition to the closed condition, said first piston being movable under the influence of force transmitted from said first member during at least a portion of the operation of said press assembly from the open condition to the closed condition with said valve means in the open condition to establish hydraulic fluid flow from said control cylinder to said second chamber of said cushion cylinder, said valve means being in the closed condition to block hydraulic fluid flow from said second chamber of said cushion cylinder through said conduit means to said control cylinder during at least an initial portion of the operation of said press assembly from the closed condition to the open condition, said second piston being movable under the influence of the gas in said first chamber of said cushion cylinder when said valve means is in the open condition to establish hydraulic fluid flow from said second chamber of said cushion cylinder to said control cylinder.

94. A press assembly as set forth in claim 93 wherein said first and second members are movable together during operation of said press assembly from the open condition toward the closed condition with at least a portion of the workpiece disposed between said first and second members, said first piston being movable under the influence of force transmitted from said first member to establish hydraulic fluid flow from said control cylinder to said second chamber of said cushion cylinder and movement of said second piston and second member in the first direction prior to movement of said first and second members together in the first direction during operation of said press assembly from the open condition toward the closed condition.

95. A press assembly as set forth in claim 94 further including means for effecting operation of said valve means from the closed condition to the open condition during operation of said press assembly from the closed condition to the open condition after said first member has moved in the second direction through a location where said first and second members initially move together in the first direction during operation of said press assembly from the open condition to the closed condition.

96. A press assembly a set forth in claim 93 wherein said second member includes surface means for defining an opening extending through said second member, said press assembly further including means for transmitting force from said first member to said first piston through the opening in said second member.

97. A press assembly as set forth in claim 93 wherein said first movable member is an upper draw ring and said second movable member is a lower draw ring, said upper and lower draw rings being disposed in abutting engagement with opposite sides of the workpiece to grip the workpiece during operation of said press assembly toward the closed condition.

98. A press assembly as set forth in claim 93 further including auxiliary means for performing an operation on the workpiece while the workpiece is in said press assembly and second conduit means for conducting hydraulic fluid flow from said control cylinder to said auxiliary means during operation of said press assembly from the open condition to the closed condition.

99. A press assembly as set forth in claim 98 wherein said auxiliary means includes accumulator means for holding hydraulic fluid under pressure during operation of said press assembly from the open condition to the closed condition, an auxiliary piston and cylinder assembly operable under the influence of hydraulic fluid pressure conducted from said accumulator means, and second valve means operable from a closed condition to an open condition to enable hydraulic fluid flow to occur between said accumulator means and said auxiliary piston and cylinder assembly to effect operation of said auxiliary means.

100. A press assembly as set forth in claim 98 wherein said auxiliary means includes an auxiliary cylinder having a first chamber for holding gas and a second chamber for holding hydraulic fluid, a third piston disposed in said auxiliary cylinder, said third piston being movable against the influence of the gas in the first chamber of said auxiliary cylinder under the influence of hydraulic fluid pressure conducted form said third conduit to the second chamber of said auxiliary cylinder.

101. A press assembly as set forth in claim 93 further including means for operating said valve means from the open condition to the closed condition in response to operation of said press assembly to the closed condition.

102. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, means operable under the influence of force transmitted from said first member to pump fluid to said cushion assembly to initiate operation of said cushion assembly toward the retracted condition prior to movement of said first and second members together in the first direction during operation of said press assembly from the open condition toward the closed condition, and valve means operable from an open condition to a closed condition to block fluid flow from said cushion assembly to maintain said cushion assembly in the retracted condition during at least an initial portion of the operation of said press assembly from the closed condition to the open condition.

103. A press assembly as set forth in claim 102 wherein said valve means is operable from the closed condition to the open condition to direct fluid flow from said cushion assembly to said means operable to pump fluid to said cushion assembly after said press assembly has operated at least part way from the closed condition toward the open condition.

104. A press assembly as set forth in claim 102 further including auxiliary means for performing an operation on the workpiece while the workpiece is in said press assembly and means for conducting fluid to said auxiliary means from said means for pumping fluid to said cushion assembly.

105. A press assembly as set forth in claim 102 wherein said means for pumping fluid to said cushion assembly during operation of said press assembly from the open condition toward the closed condition is operable under the influence of fluid conducted from said cushion assembly during operation of said cushion assembly from the retracted condition to the extended condition with said valve means in the open condition.

106. A press assembly as set forth in claim 102 wherein said cushion assembly includes wall means for defining a cylinder chamber, a piston disposed in said cylinder chamber and dividing said cylinder chamber into first and second variable volume chambers, said first variable volume chamber containing a gas, said second variable volume chamber containing hydraulic fluid, said means for pumping fluid to said cushion assembly including means for increasing the hydraulic fluid pressure in said second variable volume chamber to move said piston to increase the volume of said second variable volume chamber and decrease the volume of said first variable volume chamber while said valve means is in the open condition.

107. A press assembly as set forth in claim 102 wherein said means for pumping fluid to said cushion assembly during operation of said press assembly from the open condition toward the closed condition includes wall means for defining a cylinder chamber, a piston disposed in said cylinder chamber, means for transmitting force from said first member to said piston to pressurize fluid in said cylinder chamber, and means for conducting fluid pressure from said cylinder chamber to said cushion assembly when said valve means is in the open condition, said cushion assembly including means for effecting operation of said cushion assembly toward the retracted condition under the influence of fluid pressure conducted from said cylinder chamber.

108. A press assembly as set forth in claim 102 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

* * * * *

UNITED STATES PATENT AND TRADEMARK OFFICE
CERTIFICATE OF CORRECTION

PATENT NO. : 5,065,606

DATED : November 19, 1991                                             Page 1 of 2

INVENTOR(S) : Paul M. Kadis

It is certified that error appears in the above-identified patent and that said Letters Patent is hereby corrected as shown below:

Column 22, Line 19, Claim 2, delete "f" and insert --of--.
Column 27, Line 66, Claim 35, delete "pres" and insert --press--.
Column 28, Line 8, Claim 35, change "operating" to --operation--.
Column 29, Line 30, Claim 47, change "of" to --to--.
           Line 48, Claim 49, delete "an apparatus" and insert
           --a press assembly--.
Column 30, Line 19, Claim 52, change "of" to --to--.
Column 31, Line 33, Claim 58, delete "a press assembly" and
           insert --an apparatus--.
Column 32, Line 3, Claim 62, delete "a press assembly" and
           insert --an apparatus--.
           Line 7, Claim 62, change "to" to --of--.

UNITED STATES PATENT AND TRADEMARK OFFICE
CERTIFICATE OF CORRECTION

PATENT NO. : 5,065,606

DATED : November 19, 1991

INVENTOR(S) : Paul M. Kadis

Page 2 of 2

It is certified that error appears in the above-identified patent and that said Letters Patent is hereby corrected as shown below:

Col. 32,

Line 13, Claim 63, delete " a press assembly" and inserting -- "an apparatus".

Line 23, Claim 64, delete "a press assembly" and insert --an apparatus--.

Line 28, Claim 65, delete "a press assembly" and insert --an apparatus--.

Line 33, Claim 66, delete "an press assembly" and insert --an apparatus".

Line 41, Claim 67, delete "and" and insert --,--.

Signed and Sealed this

Twentieth Day of April, 1993

*Attest:*

MICHAEL K. KIRK

*Attesting Officer*  *Acting Commissioner of Patents and Trademarks*